US012684629B2

(12) United States Patent
Peng et al.

(10) Patent No.: US 12,684,629 B2
(45) Date of Patent: Jul. 14, 2026

(54) APPLICATION METHOD OF COMPUTING BEARER AND APPARATUS

(71) Applicant: HUAWEI TECHNOLOGIES CO., LTD., Shenzhen (CN)

(72) Inventors: Chenghui Peng, Shanghai (CN); Mingzeng Dai, Shenzhen (CN); Jianjun Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 646 days.

(21) Appl. No.: 18/170,324

(22) Filed: Feb. 16, 2023

(65) Prior Publication Data

US 2023/0199870 A1      Jun. 22, 2023

Related U.S. Application Data

(63) Continuation of application No. PCT/CN2021/108243, filed on Jul. 23, 2021.

(30) Foreign Application Priority Data

Aug. 17, 2020      (CN) .......................... 202010827476.8

(51) Int. Cl.
*H04W 76/10*          (2018.01)
*H04L 47/24*          (2022.01)

(52) U.S. Cl.
CPC ............. *H04W 76/10* (2018.02); *H04L 47/24* (2013.01)

(58) Field of Classification Search
CPC . H04W 76/10; H04W 28/0268; H04W 88/18; H04W 76/12; H04L 47/24;
(Continued)

(56) References Cited

U.S. PATENT DOCUMENTS 9,144,091 B2 *   9/2015   Yamada ................... H04W 8/14
2015/0003435 A1   1/2015   Horn et al.
(Continued)

FOREIGN PATENT DOCUMENTS

CN          103067428 A      4/2013
CN          107889171 A      4/2018

OTHER PUBLICATIONS

ETSI GS MEC 001 V1.1.1, "Mobile Edge Computing (MEC) Terminology," Mar. 2016, 7 pages.
(Continued)

*Primary Examiner* — Michael A Keller
(74) *Attorney, Agent, or Firm* — Fish & Richardson P.C.

(57)          ABSTRACT

Example methods and apparatus for application of a computing bearer is described. One example method includes establishing a first bearer and a second bearer by a first communication apparatus, where the first bearer is a computing bearer between the first communication apparatus and a second communication apparatus, and the second bearer is a computing bearer between the first communication apparatus and a first application. The first communication apparatus receives first data from the second communication apparatus over the first bearer, and forwards the first data over the second bearer. Additionally or alternatively, the first communication apparatus receives second data over the second bearer, and forwards the second data to the second communication apparatus over the first bearer.

17 Claims, 13 Drawing Sheets

(58) Field of Classification Search
CPC . H04L 41/0895; H04L 41/16; H04L 41/0806;
H04L 41/0853; H04L 65/1069; H04L
65/80; H04L 67/10
See application file for complete search history.

(56) References Cited

U.S. PATENT DOCUMENTS

| | | | |
|---|---|---|---|
| 2017/0208011 A1* | 7/2017 | Bosch | H04L 45/64 |
| 2020/0053546 A1* | 2/2020 | Panchal | H04W 72/543 |
| 2020/0359330 A1* | 11/2020 | Zacharias | H04W 52/367 |
| 2021/0377787 A1* | 12/2021 | Zhuo | H04W 72/23 |

OTHER PUBLICATIONS

3GPP TS 23.501 V16.5.1, "3rd Generation Partnership Project; Technical Specification Group Services and System Aspects; System architecture for the 5G System (5GS), Stage 1 (Release 16)," Aug. 2020, 440 pages.
International Search Report and Written Opinion in International Appln. No. PCT/CN2021/108243, mailed on Oct. 28, 2021, 13 pages (with English translation).
Partial Supplementary European Search Report in European Appln No. 21857458.0, dated Jan. 5, 2024, 10 pages.

* cited by examiner

CONT.
FROM

FROM

FROM

FROM

1207: Configuration
information of the
first bearer

1208: Send first data
over the first bearer

1209: Map the first bearer
to the second bearer

1210: Forward the
first data over the
second bearer

1211: Receive
second data over the
second bearer

1212: Map the second
bearer to the first bearer

1213: Forward the
second data over the
first bearer

1500

APPLICATION METHOD OF COMPUTING BEARER AND APPARATUS

CROSS-REFERENCE TO RELATED APPLICATIONS

This application is a continuation of International Application No. PCT/CN2021/108243, filed on Jul. 23, 2021, which claims priority to Chinese Patent Application No. 202010827476.8, filed on Aug. 17, 2020. The disclosures of the aforementioned applications are hereby incorporated by reference in their entireties.

TECHNICAL FIELD

Embodiments of this disclosure relate to the field of communication technologies, and in particular, to an application method of a computing bearer and an apparatus.

BACKGROUND

With commercial deployment of networks and emergence of industry applications, there are increasingly high requirements for computing resources (which may be referred to as computing forces). In some communication scenarios, there are high requirements for real-time performance of computing tasks. Generally, a computing request of a terminal device needs to be sent to a data computing center. The data computing center is owned by a data provider and is usually deployed far away from a radio network. If data is directly transmitted through the remote data computing center, data transmission takes long time and causes delay loss, which cannot meet the requirements for real-time performance of the computing tasks.

Mobile edge computing (MEC) may be considered as a cloud server that runs a specific task at an edge of the radio network. The computing resource is deployed in an area close to the terminal device, to introduce the computing resource into the radio access network. Currently, an actual deployment location of the MEC in the radio network usually corresponds to a local user plane function (UPF) network element in a core network. In an MEC application, a service data processing location is moved from a source data network to a local MEC based on an existing local data offloading mechanism of the core network. To be specific, an application of processing service data is moved from a physical deployment location to a location close to the core network of the radio network as much as possible, or even co-located with the local UPF. An MEC technology reduces a processing delay of the computing task to some extent.

However, the processing delay of the computing task needs to be further reduced.

SUMMARY

Embodiments of this disclosure provides an application method of a computing bearer and an apparatus, to reduce a processing delay of a computing task.

According to a first aspect, an application method of a computing bearer is provided. The method may be implemented by using the following steps: A first communication apparatus sends a trigger message to a second communication apparatus. The trigger message is used to request to establish a first bearer. The first bearer is a computing bearer between the first communication apparatus and the second communication apparatus. The trigger message includes a first field, and the first field is used to distinguish between the first bearer and a data radio bearer DRB. The first communication apparatus receives configuration information from the second communication apparatus. The configuration information is used to configure the first bearer. The computing bearer is used to carry service data for a computing task. Establishment of the first bearer can help transmit the service data for the computing task between a terminal device and a computing force over the computing bearer. This can save a path for data interaction between the terminal device and an application, further reduce a delay variation compared with an existing edge computing technology, and reduce network resource overheads while implementing a same service.

The first communication apparatus may be the terminal device or applied to the terminal device. The second communication apparatus may be a network device or applied to a network device.

In a possible design, the first communication apparatus sends first data to the second communication apparatus over the first bearer. The first data is generated when a computing task of a first application is executed. The first application is deployed on a computing force. The computing force is located inside a radio network, or the computing force is deployed outside the radio network. The computing force is directly connected to the second communication apparatus. The computing force establishes a direct connection to the second communication apparatus based on a wired protocol layer. Alternatively, the computing force may be directly deployed on the second communication apparatus. In this way, if the computing force is directly deployed on the second communication apparatus, the terminal device may communicate with the computing force on the second communication apparatus over the first bearer or an existing radio bearer, without forwarding by the network device and a core network gateway. This reduces a processing delay of the computing task. If the computing force establishes the direct connection to the second communication apparatus based on the wired protocol layer, the computing force may be located inside or outside the radio network, and the computing force may communicate with the second communication apparatus based on the wired protocol layer. In this way, the first communication apparatus sends data of the computing task to the second communication apparatus over the first bearer, and the second communication apparatus may directly send the data to the application on the computing force based on the wired protocol layer without forwarding by the network device and a core network gateway. This reduces a processing delay of the computing task.

In a possible design, the first communication apparatus receives second data from the second communication apparatus over the first bearer. The second data is generated when a computing task of a first application is executed. The first application is deployed on a computing force. The computing force is located inside a radio network, or the computing force is deployed outside the radio network. The computing force is directly connected to the second communication apparatus. For advantageous effects, refer to the descriptions in the previous possible design. Details are not described herein again.

Optionally, the direct connection between the computing force and the second communication apparatus may mean that the computing force communicates with the second communication apparatus based on the wired protocol layer. The wired protocol layer includes a network layer, a media access control layer, and/or a physical layer.

According to a second aspect, an application method of a computing bearer is provided. The method may be implemented by using the following steps: A first communication apparatus establishes a first bearer and a second bearer, where the first bearer is a computing bearer between the first communication apparatus and a second communication apparatus, and the second bearer is a computing bearer between the first communication apparatus and a first application; the first communication apparatus receives first data from the second communication apparatus over the first bearer, and forwards the first data over the second bearer; and/or the first communication apparatus receives second data over the second bearer, and forwards the second data to the second communication apparatus over the first bearer. The first bearer is established between a terminal device and a network device and the second bearer is established between the network device and the first application. In this way, data is directly transmitted between the terminal device and the first application over the first bearer and the second bearer. One-hop transmission is achieved by using the network device. This can save a path for data interaction between the terminal device and an application, further reduce a delay variation compared with an existing edge computing technology, and reduce network resource overheads while implementing a same service.

The first communication apparatus may be the network device or applied to the network device. The second communication apparatus may be the terminal device or applied to the terminal device.

In a possible design, the first application is deployed on a computing force. The computing force communicates with the first communication apparatus based on a wired protocol layer. The wired protocol layer includes a network layer, a media access control layer, and/or a physical layer. The computing bearer is used for communication between the second communication apparatus and the first application when a computing task is executed. The computing force may be located inside or outside a radio network. The computing force is directly connected to the first communication apparatus. In this way, the second communication apparatus sends data of the computing task to the first communication apparatus over the first bearer, and the first communication apparatus may directly send the data to the application on the computing force based on the wired protocol layer without forwarding by the network device and a core network gateway. This reduces a processing delay of the computing task.

In a possible design, the second bearer is established based on a wired protocol layer between the first communication apparatus and the computing force. Alternatively, the second bearer is established based on a radio access protocol layer between the first communication apparatus and the computing force.

In a possible design, the direct connection between the computing force and the first communication apparatus may mean that the computing force may communicate with the first communication apparatus based on the wired protocol layer. The wired protocol layer includes a network layer, a media access control layer, and/or a physical layer.

In a possible design, the first communication apparatus establishes a mapping relationship between the first bearer and the second bearer. The forwarding the first data over the second bearer can be implemented in the following manner: The first communication apparatus determines based on the mapping relationship, the second bearer corresponding to the first bearer, and forwards the first data over the second bearer. The forwarding the second data to the second communication apparatus over the first bearer can be implemented in the following manner: The first communication apparatus determines based on the mapping relationship, the first bearer corresponding to the second bearer, and forwards the second data to the second communication apparatus over the first bearer. In this way, data may be interacted between the terminal device and the application on the computing force over the first bearer and the second bearer. This can reduce a delay variation, and reduce network resource overheads while implementing a same service.

In a possible design, the mapping relationship between the first bearer and the second bearer includes that one first bearer corresponds to a plurality of second bearers, or a plurality of first bearers correspond to a plurality of second bearers. That the first communication apparatus determines based on the mapping relationship, the second bearer corresponding to the first bearer, and forwards the first data over the second bearer can be implemented in the following manner: The first communication apparatus determines based on the mapping relationship, the plurality of second bearers corresponding to the first bearer. If the second bearer is associated with quality of service QoS, the first communication apparatus selects based on QoS separately associated with the plurality of second bearers, a second bearer associated with QoS that meets a quality of service requirement of the first data, and forwards the first data. In this way, the second bearer that meets the quality of service requirement of the first data can be selected to transmit the first data, to improve transmission quality. Alternatively, the first communication apparatus forwards the first data over one of the plurality of second bearers based on a load balancing algorithm. In this way, load balancing of the plurality of second bearers can be implemented, to improve resource utilization.

In a possible design, the mapping relationship between the first bearer and the second bearer includes that a plurality of first bearers correspond to one second bearer, or a plurality of first bearers correspond to a plurality of second bearers. That the first communication apparatus determines based on the mapping relationship, the first bearer corresponding to the second bearer, and forwards the second data to the second communication apparatus over the first bearer can be implemented in the following manner: The first communication apparatus determines based on the mapping relationship, the plurality of first bearers corresponding to the second bearer. The first bearer is associated with QoS. The first communication apparatus selects based on QoS separately associated with the plurality of first bearers, a first bearer associated with QoS that meets a quality of service requirement of the second data, and forwards the second data. In this way, the first bearer that meets the quality of service requirement of the first data can be selected to transmit the second data, to improve transmission quality. Alternatively, the first communication apparatus forwards the second data over one of the plurality of first bearers based on a load balancing algorithm.

In a possible design, the first communication apparatus receives first information from a convergence control unit. The first information indicates the first communication apparatus to establish the first bearer and the second bearer.

In a possible design, the first information includes one or more of the following information: computing force address information, QoS configuration information, terminal authentication information, an identifier of a first task, or an identifier of the second communication apparatus. The terminal authentication information is used to authenticate whether the second communication apparatus is qualified to use the first bearer. The computing force address information is used by the first communication apparatus to establish the second bearer.

In a possible design, the first communication apparatus receives a trigger message from the second communication apparatus. The trigger message is used to request to establish the first bearer.

According to a third aspect, a communication apparatus is provided. The apparatus may be denoted as a first communication apparatus. The first communication apparatus may be applied to a terminal device, or the first communication apparatus is the terminal device, or may be an apparatus (for example, a chip, a chip system, or a circuit) located in the terminal device, or an apparatus that can be collaboratively used with the terminal device. The apparatus has a function of implementing the method in any one of the first aspect or the possible designs of the first aspect. The functions may be implemented by hardware, or may be implemented by hardware by executing corresponding software. The hardware or the software includes one or more modules corresponding to the foregoing functions. In a design, the apparatus may include a communication module and a processing module. The processing module is configured to invoke the communication module to perform a receiving and/or sending function. Further, the communication module may further include a receiving module and a sending module. For example, the sending module is configured to send a trigger message to a second communication apparatus. The trigger message is used to request to establish a first bearer. The first bearer is a computing bearer between the first communication apparatus and the second communication apparatus. The trigger message includes a first field, and the first field is used to distinguish between the first bearer and a data radio bearer DRB. The receiving module is configured to receive configuration information from the second communication apparatus. The configuration information is used to configure the first bearer.

The second communication apparatus may be a network device or applied to a network device.

In a possible design, the sending module is further configured to send first data to the second communication apparatus over the first bearer. The first data is generated when a computing task of a first application is executed. The first application is deployed on a computing force. The computing force is located inside a radio network, or the computing force is deployed outside the radio network. The computing force is directly connected to the second communication apparatus. In a possible design, the receiving module is further configured to receive second data from the second communication apparatus over the first bearer. The second data is generated when a computing task of a first application is executed. The first application is deployed on a computing force. The computing force is located inside a radio network, or the computing force is deployed outside the radio network. The computing force is directly connected to the second communication apparatus.

Optionally, the direct connection between the computing force and the second communication apparatus may mean that the computing force communicates with the second communication apparatus based on the wired protocol layer. The wired protocol layer includes a network layer, a media access control layer, and/or a physical layer.

For advantageous effects of the third aspect, refer to the corresponding descriptions of the first aspect. Details are not described herein again.

According to a fourth aspect, a communication apparatus is provided. The apparatus may be denoted as a first communication apparatus. The first communication apparatus may be applied to a network device, or the first communication apparatus is the network device, or may be an apparatus (for example, a chip, a chip system, or a circuit) located in the network device, or an apparatus that can be collaboratively used with the network device. The apparatus has a function of implementing the method in any one of the first aspect or the possible designs of the first aspect. The functions may be implemented by hardware, or may be implemented by hardware by executing corresponding software. The hardware or the software includes one or more modules corresponding to the foregoing functions. In a design, the apparatus may include a communication module and a processing module. The processing module is configured to invoke the communication module to perform a receiving and/or sending function. Further, the communication module may further include a receiving module and a sending module. For example, the processing module is configured to establish a first bearer and a second bearer. The first bearer is a computing bearer between the first communication apparatus and a second communication apparatus. The second bearer is a computing bearer between the first communication apparatus and a first application. The communication module is configured to receive first data from the second communication apparatus over the first bearer, and forward the first data over the second bearer; and/or the communication module is configured to receive second data over the second bearer, and forward the second data to the second communication apparatus over the first bearer.

The second communication apparatus may be a terminal device or applied to a terminal device.

In a possible design, the first application is deployed on a computing force. The computing force is located inside a radio network, or outside the radio network, and the computing force is directly connected to the first communication apparatus. The computing bearer is used for communication between the second communication apparatus and the first application when a computing task is executed.

Optionally, the direct connection between the computing force and the first communication apparatus may mean that the computing force communicates with the first communication apparatus based on the wired protocol layer. The wired protocol layer includes a network layer, a media access control layer, and/or a physical layer.

In a possible design, the second bearer is established based on a wired protocol layer between the first communication apparatus and the computing force. Alternatively, the second bearer is established based on a radio access protocol layer between the first communication apparatus and the computing force.

In a possible design, the processing module is further configured to: establish a mapping relationship between the first bearer and the second bearer, and determine based on the mapping relationship, the second bearer corresponding to the first bearer. The communication module is configured to forward the first data over the second bearer. The processing module is further configured to determine based on the mapping relationship, the first bearer corresponding to the second bearer. The communication module is configured to forward the second data to the second communication apparatus over the first bearer.

In a possible design, the mapping relationship between the first bearer and the second bearer includes that one first bearer corresponds to a plurality of second bearers, or a plurality of first bearers correspond to a plurality of second bearers. The processing module is configured to: determine based on the mapping relationship, the plurality of second bearers corresponding to the first bearer; and if the second bearer is associated with quality of service QoS, select based on QoS separately associated with the plurality of second bearers, a second bearer associated with QoS that meets a quality of service requirement of the first data, and forward the first data by using the communication module; or the processing module is configured to forward the first data over one of the plurality of second bearers and the communication module based on a load balancing algorithm.

In a possible design, the mapping relationship between the first bearer and the second bearer includes that a plurality of first bearers correspond to one second bearer, or a plurality of first bearers correspond to a plurality of second bearers. The processing module is configured to: determine based on the mapping relationship, the plurality of first bearers corresponding to the second bearer; and if the first bearer is associated with QoS, select, based on QoS separately associated with the plurality of first bearers, a first bearer associated with QoS that meets a quality of service requirement of the second data, and forward the second data by using the communication module; or the processing module is configured to forward the second data over one of the plurality of first bearers and the communication module based on a load balancing algorithm.

In a possible design, the communication module is further configured to receive first information from a convergence control unit. The first information indicates the first communication apparatus to establish the first bearer and the second bearer.

In a possible design, the first information includes one or more of the following information: computing force address information, QoS configuration information, terminal authentication information, an identifier of a first task, or an identifier of the second communication apparatus. The terminal authentication information is used to authenticate whether the second communication apparatus is qualified to use the first bearer. The computing force address information is used by the first communication apparatus to establish the second bearer.

In a possible design, the communication module is further configured to receive a trigger message from the second communication apparatus. The trigger message is used to request to establish the first bearer.

For advantageous effects of the fourth aspect, refer to the corresponding descriptions of the second aspect. Details are not described herein again.

According to a fifth aspect, an embodiment of this disclosure provides a communication apparatus. The apparatus includes a communication interface and a processor. The communication interface is configured for communication between the apparatus and another device, for example, data or signal receiving and sending. For example, the communication interface may be a transceiver, a circuit, a bus, a module, or an interface of another type, and the another device may be a network device. The processor is configured to invoke a group of programs, instructions, or data to perform the method described in the first aspect or the possible designs of the first aspect. The apparatus may further include a memory, configured to store the programs, the instructions, or the data invoked by the processor. The memory is coupled to the processor. When executing the instructions or the data stored in the memory, the processor may implement the method described in the first aspect or the possible designs of the first aspect.

According to a sixth aspect, an embodiment of this disclosure provides a communication apparatus. The apparatus includes a communication interface and a processor. The communication interface is configured for communication between the apparatus and another device, for example, data or signal receiving and sending. For example, the communication interface may be a transceiver, a circuit, a bus, a module, or an interface of another type, and the another device may be a terminal device. The processor is configured to invoke a group of programs, instructions, or data to perform the method described in the second aspect or the possible designs of the second aspect. The apparatus may further include a memory, configured to store the programs, the instructions, or the data invoked by the processor. The memory is coupled to the processor. When executing the instructions or the data stored in the memory, the processor may implement the method described in the second aspect or the possible designs of the second aspect.

According to a seventh aspect, an embodiment of this disclosure further provides a computer-readable storage medium. The computer-readable storage medium stores computer-readable instructions, and when the computer-readable instructions are run on a computer, the method according to the first aspect, the second aspect, the possible designs of the first aspect, or the possible designs of the second aspect is performed.

According to an eighth aspect, an embodiment of this disclosure provides a chip system. The chip system includes a processor, and may further include a memory, configured to implement the method in the first aspect, the second aspect, the possible designs of the first aspect, or the possible designs of the second aspect. The chip system may include a chip, or may include a chip and another discrete component.

According to a ninth aspect, an embodiment of this disclosure provides a communication system. The system includes a terminal device and a network device, the terminal device is configured to perform the method in the first aspect or the possible designs of the first aspect, and the network device is configured to perform the method in the second aspect or the possible designs of the second aspect.

According to a tenth aspect, a computer program product including instructions is provided. When the computer program product is run on a computer, the method in the first aspect, the second aspect, the possible designs of the first aspect, or the possible designs of the second aspect is performed.

DESCRIPTION OF EMBODIMENTS

Embodiments of this disclosure provides an application method of a computing bearer and an apparatus. The method and the apparatus are based on a same concept. Because principles for resolving a problem by using the method and the apparatus are similar, mutual reference may be made between implementations of the apparatus and the method, and repeated descriptions are omitted.

In descriptions of embodiments of this disclosure, the term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. In this disclosure, "at least one" means one or more, and "a plurality of" means two or more. In addition, it should be understood that in description of this disclosure, terms such as "first" and "second" are merely used for distinguishing and description, but should not be understood as indicating or implying relative importance, or should not be understood as indicating or implying a sequence.

The following describes in detail embodiments of this disclosure with reference to accompanying drawings.

The communication method provided in embodiments of this disclosure may be applied to a 5G communication system, for example, a 5G new radio (NR) system, or may be applied to various future evolved communication systems, for example, a 6th generation (6G) communication system and a 7th generation (7G) communication system.

Figure 1A:
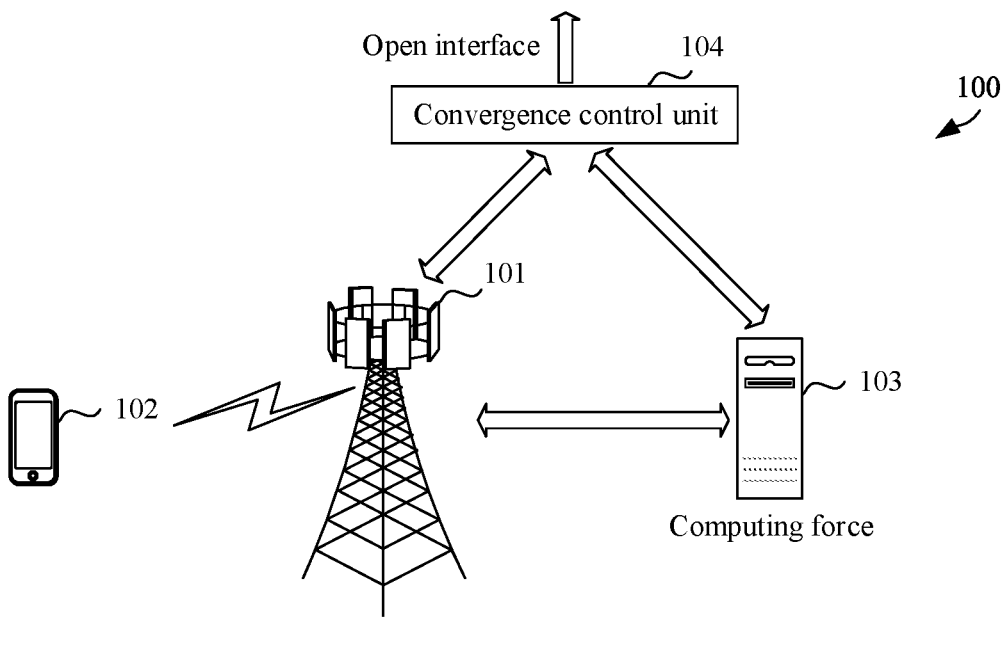
FIG. 1a is a schematic diagram 1 of an architecture of a communication system according to an embodiment of this disclosure.

FIG. 1*a* is an architecture of a communication system to which embodiments of this disclosure are applicable. As shown in FIG. 1*a*, the communication system 100 includes a network device 101 and a terminal device 102.

Possible implementations and functions of the network device 101 and the terminal device 102 are first described by using examples.

The network device 101 provides a service for the terminal device 102 within a coverage region of the network device 101. Refer to FIG. 1*a*. For example, the network device 101 provides radio access for one or more terminal devices 102 within the coverage region of the network device 101.

The network device 101 is a node inside a radio access network (RAN), and may also be referred to as a base station or a RAN node (or device). Currently, some examples of the network device 101 are a next-generation NodeB (gNB), a next-generation evolved NodeB (Ng-eNB), a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or a wireless fidelity (Wi-Fi) access point (AP). The network device 101 may alternatively be a satellite, and the satellite may also be referred to as a high-altitude platform, a high-altitude aircraft, or a satellite base station. Alternatively, the network device 101 may be another device that has a function of the network device. For example, the network device 101 may be alternatively a device that functions as a network device in device-to-device (D2D) communication, vehicle-to-everything, or machine-to-machine (M2M) communication. Alternatively, the network device 101 may alternatively be a network device in a possible future communication system.

The terminal device 102 is also be referred to as user equipment (UE), a mobile station (MS), a mobile terminal (MT), or the like, and is a device that provides a user with voice and/or data connectivity. For example, the terminal device 102 is a handheld device, a vehicle-mounted device, or the like that has a wireless connection function. Currently, the terminal device 102 may be a mobile phone, a tablet computer, a notebook computer, a palmtop computer, a mobile internet device (MID), a wearable device (for example, a smartwatch, a smartband, or a pedometer), a vehicle-mounted device (for example, the vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an uncrewed aerial vehicle, or an aircraft), or the like. The terminal device 102 may alternatively be another device that has a terminal function. For example, the terminal device 102 may alternatively be a device that functions as a terminal in D2D communication, vehicle-to-everything, or M2M communication.

The communication system 100 may further include a computing force 103.

The computing force 103 may also be referred to as a computing resource, an edge computing resource, a computing force resource, or another name. The computing force 103 may include computing resources, memory resources, or storage resources of various types and forms. The computing force 103 may be a resource integrated into the terminal device, the network device, an access network, a core network, a transmission network, or a data network. The computing force 103 may further include independently deployed resources in various forms, for example, MEC, an edge cloud, a public cloud, an industry-specific private cloud, an on-premises resource, or a combination thereof. A physical device of the computing force 103 may be based on a general-purpose central processing unit (CPU), for example, an advanced reduced instruction set computing machine (ARM) or X86. The physical device of the computing force 103 may alternatively be based on a heterogeneous computing capability such as an artificial intelligence (AI) chip, a graphics processing unit (GPU) chip, or a field programmable gate array (FPGA). The computing force 103 is provided based on virtual division of computing resources in different forms and granularities. For example, the computing force 103 includes a cluster, a host, a virtual machine (VM), a container, a virtual node (POD), or another more fine-granularity resource. The resource is a resource that can run a logic code segment or a function, for example, a cloud native serverless resource. The virtual node may include a group of containers, to be specific, include one or more containers.

In embodiments of this disclosure, the computing force 103 may be deployed inside a radio network. The radio network may be a 3rd generation partnership project (3GPP) network. The radio network may include a part or all of the terminal, access network, core network, transmission network, or data network. If the computing force 103 is deployed outside the radio network, and a direct connection can be established between the computing force 103 and the network device, the computing force 103 is applicable to the method in embodiments of this disclosure.

The computing force 103 may communicate with the network device in a wired or wireless manner. For example, the computing force 103 may establish communication with the network device through Wi-Fi, or the computing force 103 may establish communication with the network device by using a power line.

Regardless of whether the computing force 103 is deployed inside or outside the radio network, the computing force 103 is applicable to embodiments of this disclosure provided that the direct connection can be established between the network device and the computing force. The direct connection between the network device and the computing force may mean that the network device communicates with the computing force based on a wired protocol layer. The connection is established based on a network layer or a protocol layer below the network layer. The protocol layer below the network layer includes a media access control layer and/or a physical layer. In embodiments of this disclosure, one or more applications may be deployed inside the radio network. The application deployed inside the radio network may be any type of application. Generally, the application deployed inside the radio network may have a higher requirement on real-time performance, localization, data security, data privacy, or the like. For example, the application deployed inside the radio network may be an AI application, a sensing application, an AR application, an industry control application, a holographic application, an internet of things (IoT) application, an autonomous driving application, a robot application, a smart manufacturing application, an uncrewed aerial vehicle application, or a tactile internet. The sensing application includes an ecosystem monitoring application and a health monitoring application. The application may also be deployed outside the radio network. Embodiments of this disclosure describes a scenario in which the application is deployed inside the radio network. A described solution may also be applied to an application scenario in which the application is deployed outside the radio network. In embodiments of this disclosure, the application may be deployed on the computing force. The application may be software deployed on the computing force, or may be referred to as application software. When the computing force is deployed inside the radio network, the application on the computing force is deployed inside the radio network. In embodiments of this disclosure, when the application performs communication, including sending data or receiving data, communication may be performed by the computing force in which the application is located, or may be performed by a hardware device running the application software. The hardware device running the application software may be, for example, an application server or a chip.

The computing force 103 may be configured to complete a computing task based on the computing resource. The computing task may be requested by the terminal device 102 or requested by the application. When a computing task is executed between the terminal device 102 and the application on the computing force 103, communication needs to be performed. In embodiments of this disclosure, data transmission is completed over a computing bearer between the terminal device and the application. The computing task is a representation form in which the application on the computing force runs in the computing force. In embodiments of this disclosure, the computing task may also be briefly described as a task. One application may correspond to one or more tasks.

Figure 2:
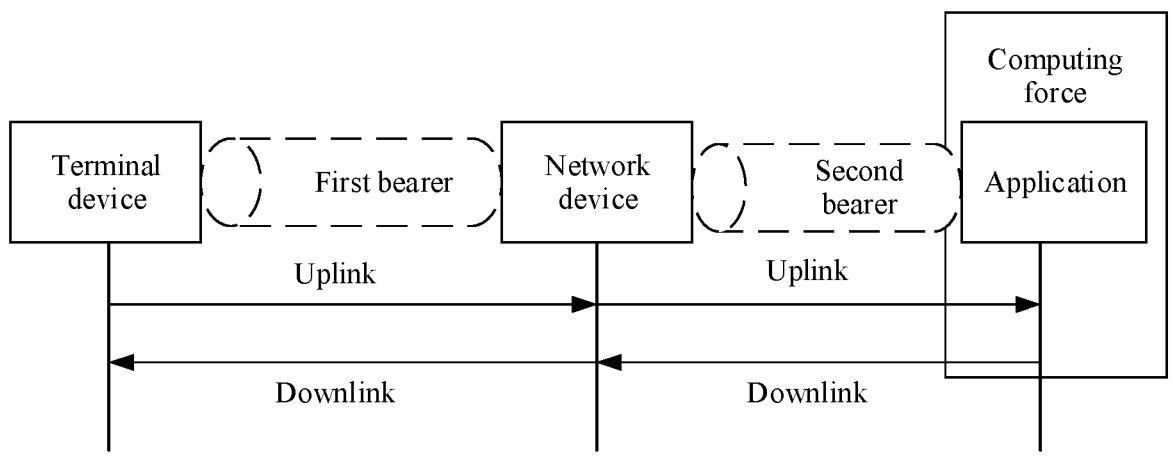
FIG. 2 is a schematic diagram of data interaction between a terminal device and an application according to an embodiment of this disclosure.

The computing bearer between the terminal device and the application may be divided into two parts. One part is a computing bearer between the terminal device and the network device, and the other part is a computing bearer between the network device and the application. For ease of description, in embodiments of this disclosure, the computing bearer between the terminal device and the network device may be denoted as a first bearer or a computing radio bearer, and the computing bearer between the network device and the application may be denoted as a second bearer or a computing application bearer. As shown in FIG. 2, data interaction between the terminal device and the application is performed through the network device. For better understanding of a data communication manner between the terminal device and the application, for example, sending data by the terminal device to the application on the computing force may be referred to as uplink data transmission, and a termination point of uplink data is the application on the computing force. Sending data by the application on the computing force to the terminal device may be referred to as downlink data transmission, and a termination point of downlink data is the terminal device. The terminal device may perform bidirectional data transmission with one or more applications on the computing force. The uplink and downlink data is transmitted between the terminal device and the application over the computing bearer. Data is transmitted between the terminal device and the network device over the first bearer, and data is transmitted between the network device and the application on the computing force over the second bearer.

Optionally, the communication system 100 may further include a convergence control unit 104.

The convergence control unit 104 is configured to receive a computing task request of the application or the terminal device, and manage a computing resource of the computing task, a computing radio bearer and a computing application bearer, including mapping between the computing radio bearer and the computing application bearer. The convergence control unit 104 further supports a third-party open interface, for example, an application programming interface (API), so that an application deployer can deploy a specific application on the computing force through the open interface, and the application deployer can trigger establishment of the computing bearer between the terminal device and the computing force through the open interface.

The convergence control unit 104 may be an independent functional entity or network element, or may be a logical function integrated into the network device, the terminal device, or another device inside the radio network. A physical device of the convergence control unit 104 may be a CPU, an AI chip, a GPU chip, or an FPGA. The convergence control unit 104 may be deployed in the access network, the core network, a radio network operation support system (OSS), or at any other location inside the radio network. The convergence control unit 104 has a management and control interface through which the convergence control unit 104 can communicate with the network device and a computing force that are managed and controlled by the convergence control unit 104. The convergence control unit 104 can indicate the network device to perform processing such as establishing, updating, and deleting the computing bearer. The convergence control unit 104 may further support computing force to process, for example, establish, update, and delete the computing resource, and provide a computing execution environment for a specific computing task.

Figure 1B:
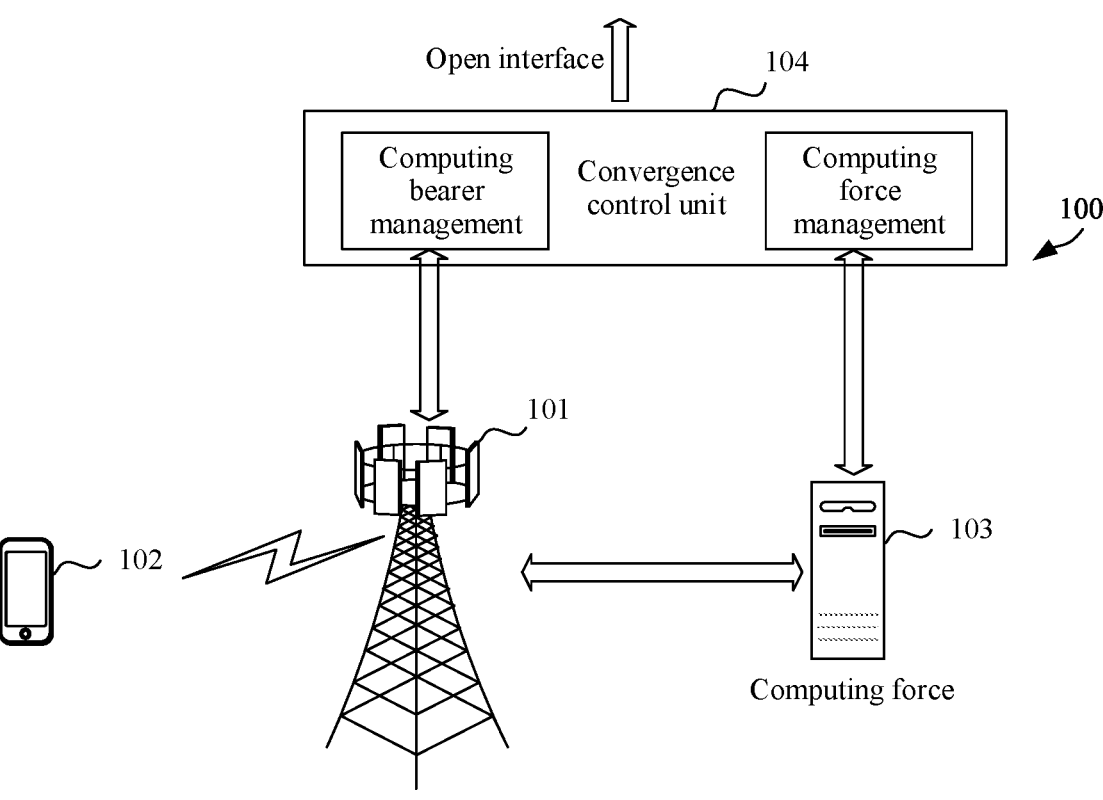
FIG. 1b is a schematic diagram 2 of an architecture of a communication system according to an embodiment of this disclosure.

As shown in FIG. 1B, the convergence control unit 104 may further include a computing bearer management function and a computing force management function. There is a management and control interface for communication between the computing bearer management function and the network device, and there is a management and control interface for communication between the computing force management function and the computing force. The computing bearer management function may be used to manage the computing radio bearer, the computing application bearer, and the mapping between the computing radio bearer and the computing application bearer. The computing force management function can be used to manage the computing resource of the computing task.

Figure 3:
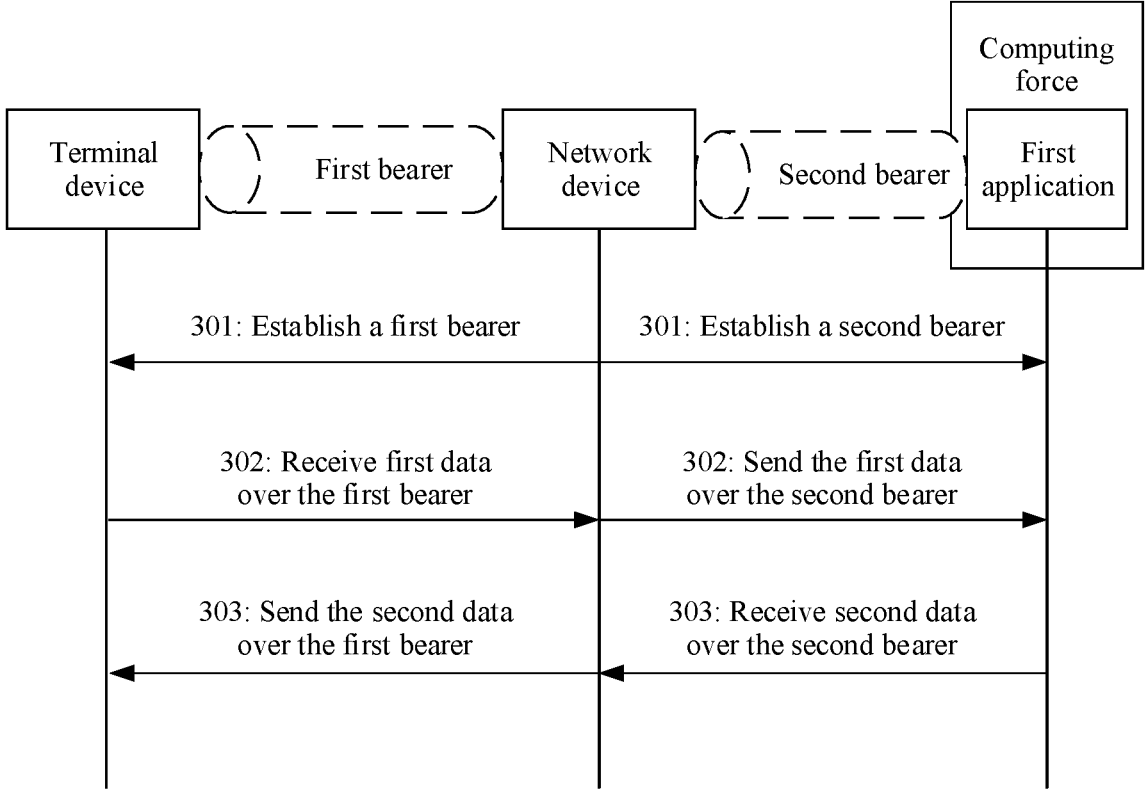
FIG. 3 is a schematic flowchart of an application method of a computing bearer according to an embodiment of this disclosure.

As shown in FIG. 3, a process of an application method of a computing bearer according to an embodiment of this disclosure is as follows.

S301: A network device establishes a first bearer and a second bearer.

The first bearer is a computing bearer between the network device and a first terminal device, and the second bearer is a computing bearer between the network device and a first application.

S302: The first terminal device sends first data to the network device over the first bearer. The network device receives the first data from the first terminal device over the first bearer, and sends the first data over the second bearer.

The network device receives the first data over the first bearer, maps the first bearer to the second bearer, and sends the first data over the second bearer. The first application on a computing force receives the first data over the second bearer.

S303: The first application on the computing force sends second data to the network device over the second bearer. The network device receives the second data over the second bearer, and sends the second data to the first terminal over the first bearer. The first terminal receives the second data from the network device over the first bearer.

The network device receives the second data over the second bearer, maps the second bearer to the first bearer, and sends the second data over the first bearer.

The network device needs to have a function of mapping between the first bearer and the second bearer and a function of forwarding the first data and the second data. Herein, the first data is uplink data, and the second data is downlink data.

S302 and S303 are not subject to a strict sequence. Data interaction between the terminal device and the application may be uplink transmission and then downlink transmission, or may be downlink transmission and then uplink transmission, or may be concurrent uplink transmission and downlink transmission.

In the embodiment in FIG. 3, the first bearer is established between a terminal device and a network device and the second bearer is established between the network device and the first application. In this way, data is directly transmitted between the terminal device and the first application over the first bearer and the second bearer. One-hop transmission is achieved by using the network device. This can save a path for data interaction between the terminal device and the application, further reduce a delay variation compared with an existing edge computing technology, and reduce network resource overheads while implementing a same service. A difference between the computing force in this embodiment of this disclosure and existing MEC lies in that the network device senses the computing force instead of the MEC, and the computing force may establish a direct data connection (to be specific, the second bearer) to the network device. This can implement efficient data transmission between the terminal device and the computing force, achieving one-hop data transmission. However, because the network device does not sense the MEC, data transmitted between the existing terminal device and the MEC needs to be forwarded by the network device and a core network gateway.

The embodiment in FIG. 3 shows one application. Actually, the terminal may interact with a plurality of applications on the computing force. An interaction method is similar to that of the first application, to be specific, data is transmitted by establishing the first bearer and the second bearer.

The following describes optional implementations of the first bearer and the second bearer in this embodiment of this disclosure.

The first bearer is a radio data transmission bearer between the network device and the terminal device, and is a radio bearer. The second bearer is a data transmission bearer between the network device and the application on the computing force, and may be a radio bearer or a wired bearer.

The following describes the wired and radio bearer types.

1. A First Bearer is a Radio Bearer, and a Second Bearer is a Wired Bearer.

Figures 4, 5:
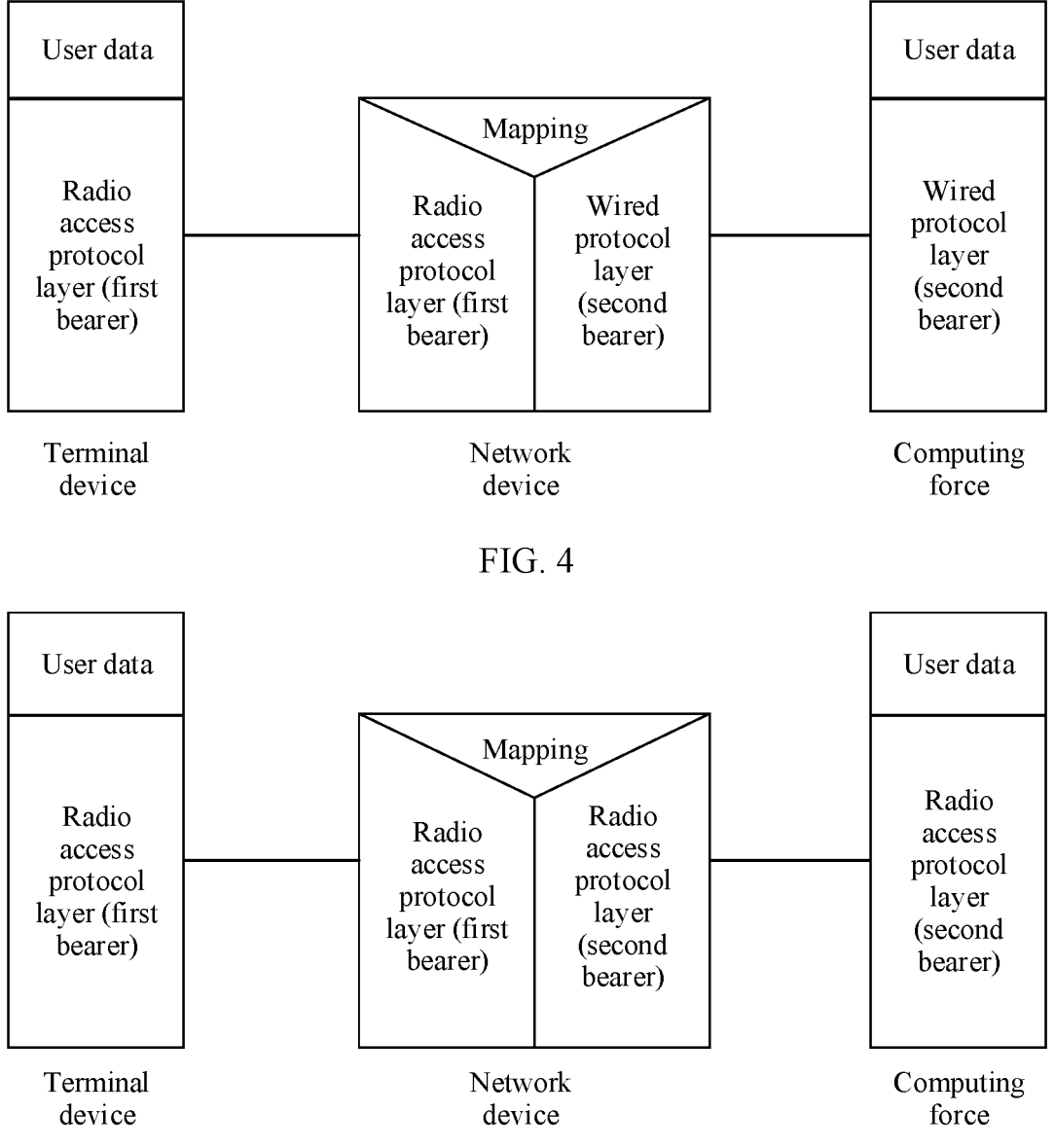
FIG. 4 is a schematic diagram 1 of a corresponding form of a protocol layer between a terminal device, a network device, and a computing force according to an embodiment of this disclosure.
FIG. 5 is a schematic diagram 2 of a corresponding form of a protocol layer between a terminal device, a network device, and a computing force according to an embodiment of this disclosure.

FIG. 4 shows a corresponding form of a protocol layer between a terminal device, a network device, and a computing force.

A radio access protocol layer of the terminal device corresponds to a radio access protocol layer of the network device. The terminal device implements wireless connection and data interaction with the network device based on the radio access protocol layer. Similarly, the network device implements wireless connection and data interaction with the terminal device based on the radio access protocol layer. The radio access protocol layer may include one or more layers of protocols. For example, the radio access protocol layer includes the following one or more protocol layer functions: a radio resource control (RRC) layer, a packet data convergence protocol (PDCP) layer, a radio link control RLC layer, a media access control (MAC) layer, or a physical (PHY) layer. A first bearer is a generic term of protocol entities and configurations of the radio access protocol layer. For example, the first bearer may include a PDCP entity, an RLC entity, a MAC/PHY, and a related resource allocated by the network device to the first bearer. There may be a plurality of PDCP entities and the RLC entities based on a user granularity.

A wired protocol layer of the network device corresponds to a wired protocol layer of the computing force. The wired protocol layer means a protocol over a wired connection. A wired connection medium may be, for example, a bus, an optical fiber, a copper wire, a power line, or a universal serial bus (USB) data line. The wired protocol layer may include a physical layer, a media access control layer (such as an Ethernet MAC), and a network layer. The network layer may be, for example, an internet protocol (IP) layer. The network device implements data interaction with the application on the computing force based on the wired protocol layer. Similarly, the application on the computing force implements data interaction with the network device based on the wired protocol layer. The second bearer is established on the wired protocol layer, and the second bearer is implemented based on the network layer of the wired protocol layer, or the second bearer is implemented based on the media access layer or the physical layer below the network layer. For example, the second bearer is implemented based on a tunnel technology of the wired network layer or the media access control layer, for example, a virtual private network (VPN) tunnel. FIG. 4 further shows there is user data above the radio access protocol layer of the terminal device. In addition, there is user data above the wired protocol layer of the computing force. The user data is a payload interacted between the terminal device and the application on the computing force. Protocol stack composition of the payload is determined by the application. The payload may include only service data of the application. For example, the payload may be a layer 7 (L7), namely, the application layer in a seven-layer framework model defined by the international organization for standardization (ISO) for network interconnection. The payload may also include protocol headers of layer 3 to layer 6 (L3 to L6), or protocol headers of some layers in the L3 to the L6 in the ISO seven-layer protocol, for example, include protocol headers of the internet protocol/transmission control protocol (IP/TCP) or the internet protocol/user datagram protocol (IP/UDP).

The network device further has a bearer mapping function that maps the first bearer to the second bearer, and maps the second bearer to the first bearer. In other words, the network device needs to have a function of mapping between the computing radio bearer and the computing application bearer. The computing application bearer herein is a wired bearer.

Based on this, in an uplink direction, the terminal device transmits uplink data to the network device over the first bearer formed by the radio access protocol layer. The network device receives the uplink data from the terminal device over the first bearer, maps the first bearer to the second bearer, transmits the uplink data to the application on the computing force over the second bearer formed by the wired protocol layer. The application on the computing force receives the uplink data from the network device over the second bearer. The uplink data is terminated at the computing force.

In a downlink direction, the application on the computing force transmits downlink data to the network device over the second bearer formed by the wired protocol layer. The network device receives the downlink data from the application on the computing force over the second bearer, maps the second bearer to the first bearer, and transmits the downlink data to the terminal device over the first bearer formed by the radio access protocol layer. The terminal device receives the downlink data from the network device over the first bearer. The downlink data is terminated at the terminal device.

2. A First Bearer is a Radio Bearer, and a Second Bearer is a Radio Bearer.

FIG. 5 shows a corresponding form of a protocol layer between a terminal device, a network device, and a computing force. In this embodiment, the computing force is wirelessly connected to the network device. In a possible application scenario, the computing force is deployed on the terminal device, so that a wireless connection may be established between the computing force and the network device. For example, the computing force is deployed on a vehicle-mounted terminal or a server having a wireless connection capability.

A radio access protocol layer of the terminal device corresponds to a radio access protocol layer of the network device. For specific details, refer to the description of the embodiment in FIG. 4.

A radio access protocol layer of the network device corresponds to a radio access protocol layer of the computing force. In this case, the second bearer and the first bearer are constructed in a similar form. Actually, the second bearer is a radio bearer. For example, the second bearer may include each radio access protocol entity and a series of resources allocated to the second bearer.

For description of the user data, refer to the description of the user data in the embodiment in FIG. 4. Details are not described herein again.

Similarly, the network device supports mapping between the first bearer and the second bearer, and the second secondary bearer herein is a radio bearer. In other words, the network device supports mapping between two radio bearers.

Based on this, in an uplink direction, the terminal device transmits uplink data to the network device over the first bearer formed by the radio access protocol layer. The network device receives the uplink data from the terminal device over the first bearer, maps the first bearer to the second bearer, transmits the uplink data to the application on the computing force over the second bearer formed by the radio access protocol layer. The application on the computing force receives the uplink data from the network device over the second bearer. The uplink data is terminated at the computing force.

In a downlink direction, the application on the computing force transmits downlink data to the network device over the second bearer formed by the radio access protocol layer. The network device receives the downlink data from the application on the computing force over the second bearer, maps the second bearer to the first bearer, and transmits the downlink data to the terminal device over the first bearer formed by the radio access protocol layer. The terminal device receives the downlink data from the network device over the first bearer. The downlink data is terminated at the terminal device.

3. A Terminal Device and a Computing Force do not Belong to a Same Network Device.

When the terminal device and the computing force do not belong to the same network device, a communication channel between the terminal device and the computing force may be implemented through an interface between two network devices.

Figure 6:
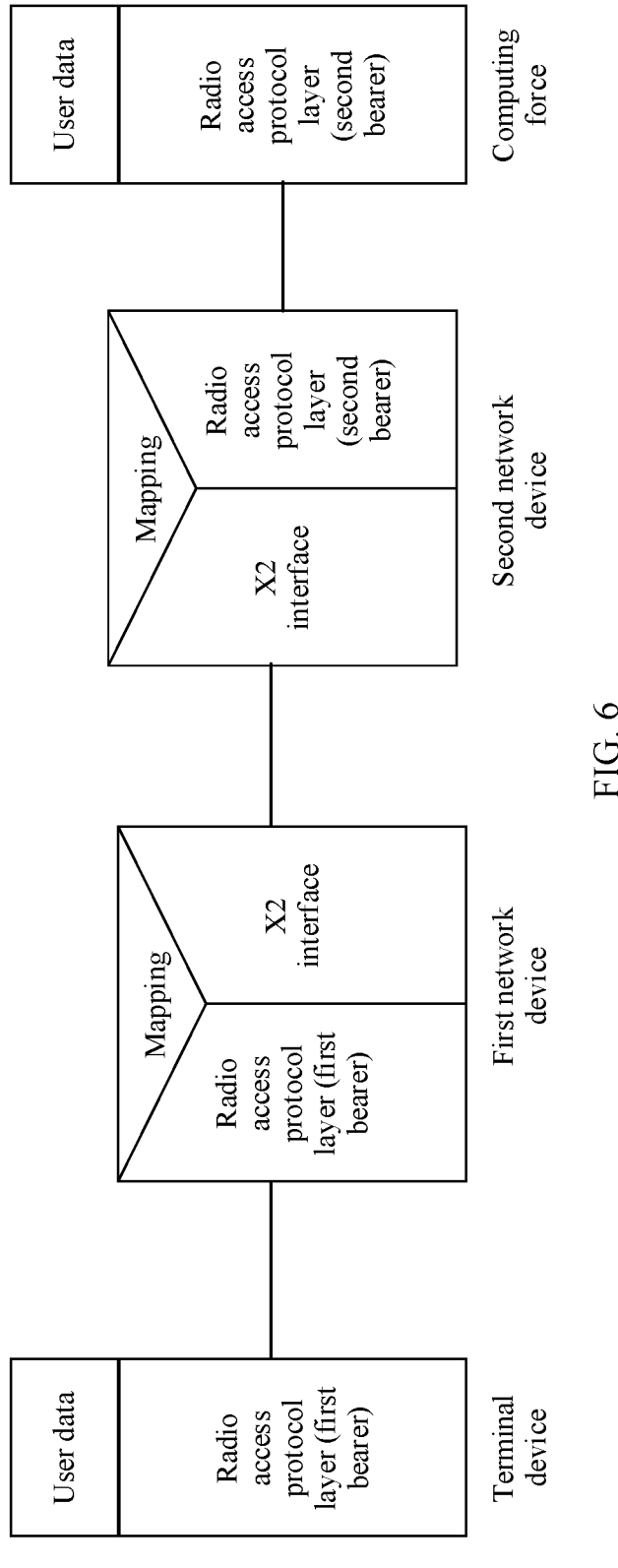
FIG. 6 is a schematic diagram 3 of a corresponding form of a protocol layer between a terminal device, a network device, and a computing force according to an embodiment of this disclosure.

FIG. 6 shows a corresponding form of a protocol layer between the terminal device, a first network device, a second network device, and the computing force.

The terminal device belongs to the first network device, and the computing force belongs to the second network device. For example, the terminal device accesses the first network device through a radio network. The computing force is located on another terminal device, and accesses the second network device through the radio network.

A radio access protocol layer of the terminal device corresponds to a radio access protocol layer of the first network device. The terminal device implements wireless connection and data interaction with the first network device based on the radio access protocol layer. Similarly, the first network device implements wireless connection and data interaction with the terminal device based on the radio access protocol layer. A first bearer is implemented based on the radio access protocol layer of the terminal device and a radio access protocol layer of a first network device.

A radio access protocol layer of the second network device corresponds to a radio access protocol layer of the computing force. An application on the computing force implements wireless connection and data interaction with the second network device based on the radio access protocol layer. Similarly, the second network device implements wireless connection and data interaction with the application on the computing force based on the radio access protocol layer. A second bearer is implemented based on the radio access protocol layer of the second network device and the radio access protocol layer of the computing force.

The first network device may communicate with the second network device through an interface. The interface may be an X2 interface, an Xn interface, or an interface in another form between the network devices.

For description of the user data, refer to the description of the user data in the embodiment in FIG. 4. Details are not described herein again.

There is the interface between the first network device and the second network device, for example, may be an X2 interface or an Xn interface. The X2 interface is used as an example. An X2 session may be established between the first network device and the second network device, and the X2 session is a session transmitted through the X2 interface.

Based on this, in an uplink direction, the terminal device transmits uplink data to the first network device over the first bearer formed by the radio access protocol layer. The first network device maps the first bearer to the X2 session, and transmits the uplink data to the second network device through the X2 interface. The second network device receives the uplink data from the first network device through the X2 session, maps the first bearer to the second bearer, and transmits the uplink data to the application on the computing force over the second bearer formed by the radio access protocol layer. The uplink data is terminated at the application on the computing force.

In a downlink direction, the application on the computing force transmits downlink data to the second network device over the second bearer formed by the radio access protocol layer. The second network device transmits the downlink data to the first network device through the X2 session. The first network device receives the downlink data from the second network device through the interface, maps the X2 session to the first bearer, and transmits downlink data to the terminal device over the first bearer formed by the radio access protocol layer. The downlink data is terminated at the terminal device.

It can be learned from the description of the first point to the third point that data may be interacted between the terminal device and the application on the computing force over the first bearer and the second bearer.

Figure 7:
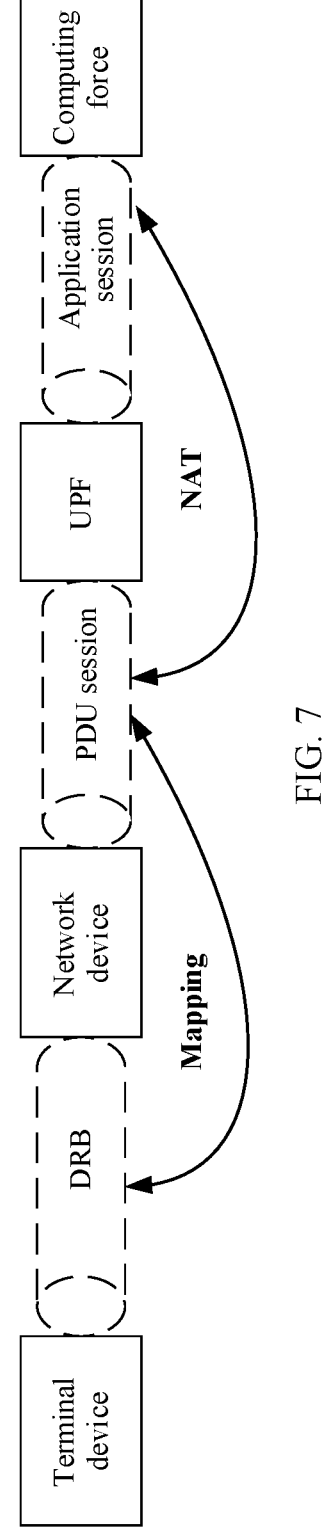
FIG. 7 is a schematic flowchart of a service data processing protocol according to an embodiment of this disclosure.

As shown in FIG. 7, in a conventional service data processing protocol process, a data radio bearer (DRB) is established between a terminal device and a network device. After uplink data on the DRB is processed by a radio access protocol layer, the network device forwards the uplink data on the DRB to a corresponding PDU session based on mapping between the DRB and a protocol data unit (PDU) session of a core network, and sends the PDU session to a user plane function (UPF) of a core network gateway. The UPF processes routing information in the uplink data, converts the PDU session into an application session, and communicates with an application on a computing force deployed in a data network (DN). The PDU session may be converted into the application session in a network address translation (NAT) manner. In the conventional service data processing protocol process, the network device in an access network, the UPF of the core network, and the DN need to perform bearer and session mapping for a plurality of times, resulting in much signaling processing and data protocol processing. However, in this embodiment of this disclosure, data may be interacted between the terminal device and the application on the computing force over the first bearer and the second bearer. Compared with the conventional service data processing protocol process, this can further reduce a delay variation, and reduce network resource overheads while implementing a same service.

The following describes establishment and application processes of a computing bearer in different application scenarios, including establishment and application of a first bearer and a second bearer.

Application Scenario 1: A Computing Force is Deployed Outside a Terminal Device and a Network Device.

Figure 8:
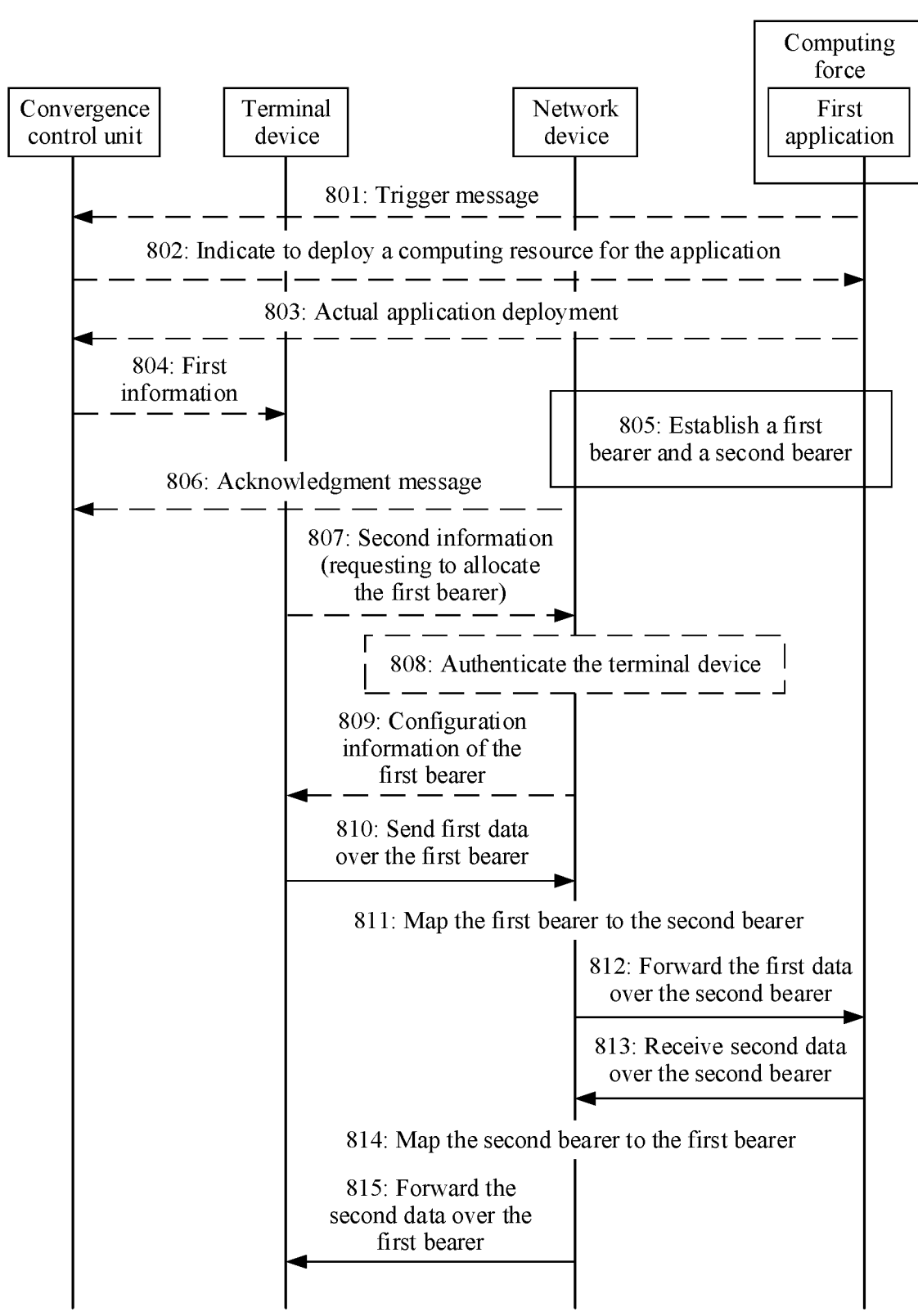
FIG. 8 is a schematic flowchart 1 of establishment and application processes of a computing bearer in an application scenario 1 according to an embodiment of this disclosure.

FIG. 8 shows a flowchart of establishment and application processes of a computing bearer.

S801: A convergence control unit receives a trigger message from an application.

The trigger message may carry an application deployment requirement.

S802: The convergence control unit indicates the computing force to deploy a computing resource for the application, and deploys the application on the computing force.

The convergence control unit sends indication information to the computing force based on the application deployment requirement carried in the trigger message, to indicate the computing force to deploy the computing resource for the application.

After receiving the indication from the convergence control unit, the computing force deploys the application on the computing force based on the indication. A process of deploying the application on the computing force includes resource allocation of the computing force. Any subsequent general, open-source, standard, or dedicated technical means may be used for resource allocation and application deployment, for example, an open-source Kubernetes container orchestrator.

S803: The computing force feeds back actual application deployment information to a convergence control unit.

S801 to S803 are a process of deploying the application on the computing force. They are optional steps, and preparation steps prior to establishment and application of the computing bearer, and may be implemented in another manner. This is not limited in this embodiment of this disclosure.

It may be understood that there may be one or more computing forces. For an operation performed by any computing force or an operation performed by another device for any computing force, refer to descriptions in this embodiment of this disclosure.

S804: The convergence control unit sends the first information to the network device, and the network device receives the first information from the convergence control unit.

The first information indicates the network device to establish the first bearer and the second bearer. Optionally, the first information may include one or more of the following computing force information: computing force address information, quality of service (QoS) configuration information, or terminal authentication information. The computing force address information may be an IP address, a MAC address, a virtual local area network identifier (VLAN ID), or any other identifier address that can be used to establish the second bearer.

Optionally, the convergence control unit may determine, based on the application deployment information received from the computing force, computing force information included in the first information.

S805: The network device establishes the first bearer and the second bearer.

The network device establishes the first bearer.

Establishment of the second bearer between the network device and the computing force is establishment of a computing application bearer between the network device and the computing force. The computing application bearer may be a wired bearer or a radio bearer.

After establishing the first bearer and the second bearer, the network device establishes a mapping relationship between the first bearer and the second bearer. The mapping relationship may be represented in a table, a graph, a function, or any form.

It may be understood that when there are a plurality of second bearers, the plurality of second bearers may be second bearers between the network device and a plurality of computing forces.

S806: The network device sends an acknowledgment message to the convergence control unit.

The acknowledgment message is used to respond to the first information, and indicates that the computing bearer is established. This step is optional.

S807: The terminal device sends second information to the network device, and the network device receives the second information from the terminal device.

The second information is used to request to allocate the first bearer or apply for a configuration of the first bearer.

The second information may be RRC signaling. The terminal device may send the first information in a network access process or after completing network access. For example, the terminal device sends a message 1 or a message 3 in a random access process. The message 1 or the message 3 is the second information, or the message 1 or the message 3 carries the second information.

Optionally, the second information may include authentication information. The second information may further include a type of a task supported by the terminal device, or a type of a task to be executed by the terminal device. The second information may carry a task identifier or a task type identifier, indicating the type of the task supported or executed by the terminal device.

S808: The network device authenticates the terminal device.

An objective of authentication is to verify whether the terminal device is qualified to use the established first bearer. Optionally, the network device may authenticate the terminal device based on the terminal authentication information included in the first information received from the convergence control unit and the authentication information included in the second information. The network device may authenticate the terminal together with the convergence control unit or the computing force. For example, the network device or the computing force functions as an authentication proxy, and the convergence control unit functions as an authentication and authorization server. A used authentication algorithm is not limited in this embodiment of this disclosure. For example, authentication is performed by using extensible authentication protocol-authentication and key agreement (EAP-AKA) or EAP-transport layer security (TLS) based on the extensible authentication protocol (EAP), which is widely used in a radio network, to complete authentication on whether the terminal is qualified to use the established first bearer.

This step is optional.

S809: The network device sends configuration information of the first bearer to the terminal device, and the terminal device receives the configuration information of the first bearer from the network device.

S810: The terminal device sends first data to the network device over the first bearer. The network device receives the first data from the terminal device over the first bearer.

The first data herein may also be referred to as uplink data. The terminal device may send the first data based on the received configuration information of the first bearer. Optionally, the first data carries an identifier of the application on the computing force. The first data is generated when a computing task of a first application is executed.

S811: The network device determines the second bearer that has the mapping relationship with the first bearer.

The network device may map the first bearer to the second bearer based on the established mapping relationship between the first bearer and the second bearer.

S812: The network device sends the first data over the second bearer.

The network device may send the first data to the application on the computing force over the second bearer. When there are a plurality of second bearers, the network device may need to send the first data to applications on a plurality of computing forces, or select some computing forces from the plurality of computing forces to send the first data.

S810 to S812 are an uplink data transmission process from the terminal device to the application on the computing force. The following describes, by using S813 to S815, a downlink data transmission process from the application on the computing force to the terminal device. It may be understood that the uplink data transmission process and the downlink data transmission process are not performed in a strict sequence, and may exchange sequences, or may be concurrently performed. Alternatively, only uplink data transmission may occur, and S813 to S815 are omitted. Alternatively, only downlink data transmission occurs, and S810 to S812 are omitted.

S813: The application on the computing force sends second data to the network device over the second bearer, and the network device receives the second data from the application on the computing force over the second bearer.

The second data herein may also be referred to as downlink data. The second data is generated when a computing task of a first application is executed. Optionally, the second data carries an identifier of the terminal device.

The application on the computing force may transmit the second data over the second bearer established in S805.

S814: The network device determines the first bearer that has the mapping relationship with the second bearer.

The network device may map the second bearer to the first bearer based on the established mapping relationship between the first bearer and the second bearer.

S815: The network device sends the second data to the terminal device over the first bearer. The terminal device receives the second data from the network device over the first bearer.

In S813 to S815, there may be a plurality of computing forces, and there may be a plurality of second bearers. For an operation performed by any computing force, refer to the description in this embodiment of this disclosure.

The following describes in detail a possible implementation in which the network device establishes the computing bearer.

In S805, the network device may trigger establishment of the first bearer based on one or more tasks. For example, in S804, the convergence control unit sends the first information to the network device. The first information includes one or more task identifiers, and indicates the network device to separately establish a first bearer for each of the tasks included in the first information.

Figures 9A, 9B, 10A:
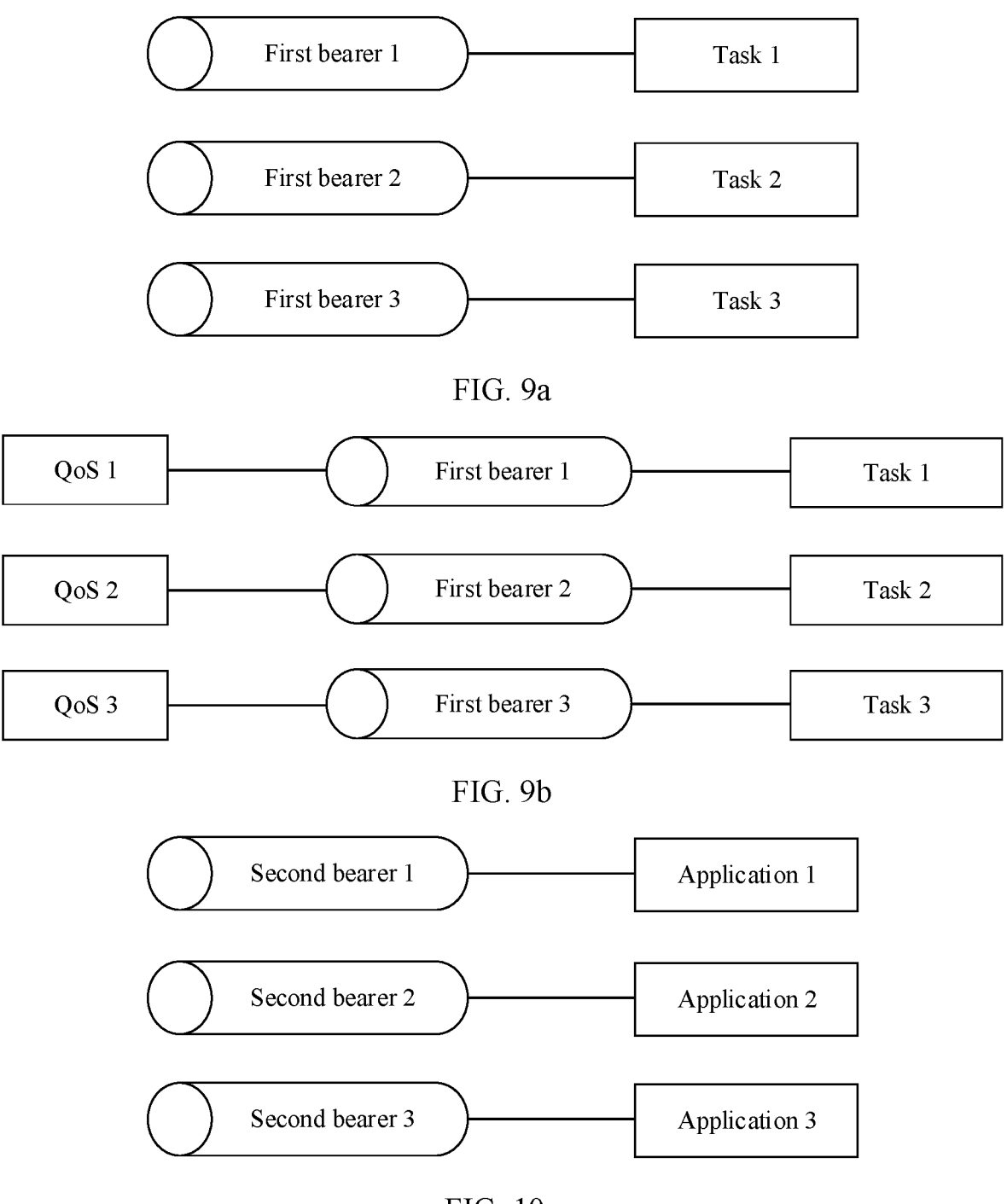
FIG. 9*a* is a schematic diagram of a correspondence between a first bearer and a task according to an embodiment of this disclosure.
FIG. 9*b* is a schematic diagram of a correspondence between a first bearer, QoS, and a task according to an embodiment of this disclosure.
FIG. 10*a* is a schematic diagram of a correspondence between a second bearer and an application according to an embodiment of this disclosure.

The network device establishes, for each task in the one or more tasks based on a task granularity, a first bearer corresponding to the task. For example, as shown in FIG. 9a, it is assumed that the first information includes three task identifiers, and the network device separately establish a first bearer for each of three tasks. The network device establishes a first bearer 1 for a task 1, a first bearer 2 for a task 2, and a first bearer 3 for a task 3.

One or more terminal devices may be involved in one task. When the terminal devices are involved in one task, the terminal devices may share a first bearer corresponding to the task. For example, if both a first terminal device and a second terminal device support the task 1 or need to execute the task 1, the network device may separately send configuration information of the first bearer 1 to both the first terminal device and the second terminal device in S809. Certainly, if one terminal device supports or needs to execute a plurality of tasks, the network device may alternatively send, to the terminal device, first bearers respectively corresponding to the plurality of tasks in S809. For example, the terminal device supports (or needs to execute) the task 1 and the task 2, and the network device sends the configuration information of the first bearer 1 and configuration information of the first bearer 2 to the terminal device in S809.

The network device may determine, by using the second information received from the terminal device in S807, a task supported or needs to be executed by the terminal device, and allocate, to the terminal device based on the task, a first bearer corresponding to the task.

In a scenario in which the network device establishes the first bearer based on the task granularity, the first bearer is associated with a specified attribute. For example, the first bearer may be associated with QoS. Different tasks may have different quality of service requirements. When one task corresponds to one first bearer, a QoS attribute may be associated, based on a quality of service requirement of the task, with the first bearer corresponding to the task. Based on the example in FIG. 9a, as shown in FIG. 9b, the network device establishes the first bearer 1 for the task 1, the first bearer 2 for the task 2, and the first bearer 3 for the task 3. It is assumed that a quality of service requirement of the task 1 is a quality of service requirement 1, a quality of service requirement of the task 2 is a quality of service requirement 2, and a quality of service requirement of the task 3 is a quality of service requirement 3. The quality of service requirement may be a quantized value; or may be in another representation form, for example, higher, high, lower, or low. Different tasks may have different quality of service requirements. In this case, the first bearer 1 is associated with QoS 1, the first bearer 2 is associated with QoS 2, and the first bearer 3 is associated with QoS 3. Certainly, when a plurality of tasks are involved, quality of service requirements of some tasks may be the same. In this case, first bearers corresponding to the some tasks may be associated with same QoS.

It is assumed that an application that triggers establishment of the computing bearer is vehicle-to-everything (V2X) communication. There are different types of communication services in V2X communication, and correspondingly, there are different quality of service requirements. For example, a quality of service requirement of a V2X communication service used for autonomous driving is very high, and corresponds to the QoS 1. A quality of service requirement of the V2X communication service used for vehicle information collection is lower, and corresponds to the QoS 2. In this case, the network device establishes the first bearer 1 for the V2X communication service used for autonomous driving, and the first bearer 1 is associated with the QoS 1. The network device establishes the first bearer 2 for the V2X communication service used for vehicle information collection, and the first bearer 2 is associated with the QoS 2.

It may be understood that the first bearer may be further associated with another attribute in a manner similar to that of the QoS.

A configuration of the first bearer sent by the network device to the terminal device may include a first bearer corresponding to a task that is supported or needs to be executed by the terminal device. There may be one or more tasks supported or need to be executed by the terminal. In the case of the tasks, the terminal device receives configurations of a plurality of first bearers.

The terminal device may send uplink data for a specific task at a moment. In this case, the terminal device determines, based on the configuration of the first bearer from the network device and a task to which the uplink data to be sent currently belongs, a first bearer corresponding to the task, and sends the uplink data to the network device over the determined first bearer. Certainly, the terminal device may concurrently trigger uplink data transmission for the tasks. Similarly, the terminal device determines, based on the configuration of the first bearer from the network device, first bearers respectively corresponding to the tasks, and sends the uplink data to the network device over the first bearers corresponding to the tasks.

Because the network device establishes the first bearer based on a task granularity, and a plurality of terminals may be involved in one task, the network device receives the uplink data from the terminal device over the first bearer. When the network device forwards the uplink data, the network device may determine a specific terminal device based on session information in the first bearer. The session information may include a session identifier. The session information may further include session identifier information jointly formed based on various protocol fields, for example, one or more information of a source address, a destination address, a source port, or a destination port of a session. The session information may be represented in a plurality of manners. One manner is that the session information may be obtained from protocol data, for example, a unique session is determined based on a 5-tuple (including a source IP address, the source port, a destination IP address, the destination port, and a transport layer protocol). Another manner is a QoS flow defined in the 3GPP.

Figures 10B, 11A, 11B, 11C:
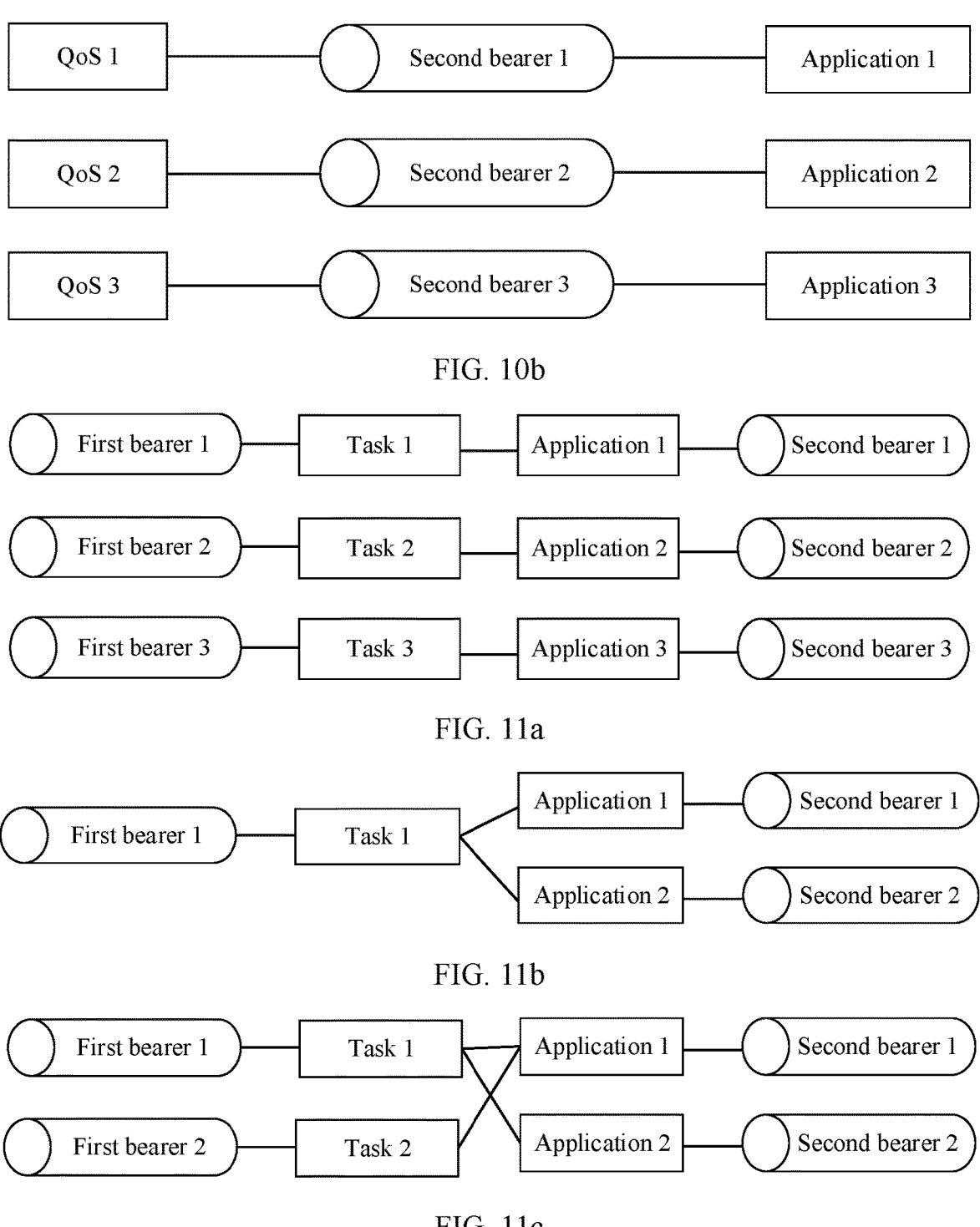
FIG. 10*b* is a schematic diagram of a correspondence between a second bearer, QoS, and an application according to an embodiment of this disclosure.
FIG. 11*a* is a schematic diagram 1 of a mapping relationship between a first bearer and a second bearer according to an embodiment of this disclosure.
FIG. 11*b* is a schematic diagram 2 of a mapping relationship between a first bearer and a second bearer according to an embodiment of this disclosure.
FIG. 11*c* is a schematic diagram 3 of a mapping relationship between a first bearer and a second bearer according to an embodiment of this disclosure.

In S805, the second bearer is established between the network device and the computing force. One or more applications may be deployed on the computing force. The network device may establish one second bearer for one application. When the application on the computing force communicates with the terminal device, the application on the computing force sends the downlink data to the network device over a second bearer corresponding to the application. When the applications are deployed on the computing force, the network device may establish a plurality of second bearers corresponding to the applications with and the computing force. As shown in FIG. 10a, it is assumed that an application 1, an application 2, and an application 3 are deployed on a computing force. A network device and a computing force separately establish a second bearer for each of the three applications. To be specific, a second bearer 1 is established for the application 1, a second bearer 2 is established for the application 2, and a second bearer 3 is established for the application 3. Similar to the first bearer, the second bearer may be associated with a specified attribute. For example, the second bearer may be associated with QoS. Different applications may have different quality of service requirements. QoS may be associated, based on a quality of service requirement of an application, with the second bearer corresponding to the application. Based on FIG. 10a, as shown in FIG. 10b, the second bearer 1 is associated with QoS 1, the second bearer 2 is associated with QoS 2, and the second bearer 3 is associated with QoS 3. It may be understood that the second bearer may be further associated with another attribute in a manner similar to that of the QoS.

For example, a quality of service requirement of a V2X communication service used for autonomous driving is very high, and corresponds to the QoS 1. A quality of service requirement of an environment sensing application corresponds to the QoS 2. A quality of service requirement of an uncrewed aerial vehicle application corresponds to the QoS 3. It may be understood that the network device may further establish second bearers with a plurality of computing forces, where each computing force in the plurality of computing forces may be executed in the foregoing manner.

The following describes how the network device establishes a mapping relationship between the first bearer and the second bearer in the embodiment in FIG. 8.

The network device establishes the first bearer based on a task granularity, and one task corresponds to one first bearer. The network device establishes a second bearer for each application, and one application corresponds to one second bearer. One application may run one or more tasks, and a plurality of applications may run one task. For example, the mapping relationship between the first bearer and the second bearer may have the following types.

(1) A First Bearer and a Second Bearer are in a One-to-One Mapping Relationship.

For example, as shown in FIG. 11a, an application 1 may run a task 1, a second bearer 1 is established for the application 1, and a first bearer 1 is established for the task 1. In this case, there is a correspondence between the first bearer 1 and the second bearer 1. The application 2 may run a task 2, a second bearer 2 is established for the application 2, and a first bearer 2 is established for the task 2. In this case, there is a correspondence between the first bearer 2 and the second bearer 2. The application 3 may run a task 3, a second bearer 3 is established for the application 3, and a first bearer 3 is established for the task 3. In this case, there is a correspondence between the first bearer 3 and the second bearer 3.

(2) A First Bearer and a Second Bearer are in a One-to-Many Mapping Relationship.

For example, as shown in FIG. 11b, an application 1 and an application 2 may both run a task 1, a network device establishes a first bearer 1 for the task 1, a second bearer 1 for the application 1, and a second bearer 2 for the application 2. Then, the first bearer 1 has a mapping relationship with both the second bearer 1, and the second bearer 2.

(3) A First Bearer and a Second Bearer are in a Many-to-Many Mapping Relationship.

One first bearer may be mapped to a plurality of second bearers, and one second bearer may also be mapped to a plurality of first bearers.

For example, as shown in FIG. 11c, an application 1 may run a task 1 and a task 2, and both the application 1 and an application 2 may run the task 1. A second bearer 1 is established for the application 1, a second bearer 2 is established for the application 2, a first bearer 1 is established for the task 1, and a first bearer 2 is established for the task 2. Then, the first bearer 1 may have a mapping relationship with both the second bearer 1 and the second bearer 2. The second bearer 1 may have a mapping relationship with both the first bearer 1 and the first bearer 2.

After establishing the mapping relationship between the first bearer and the second bearer, a network device stores the mapping relationship. When forwarding uplink data, the network device determines, based on the mapping relationship, a second bearer corresponding to a first bearer, and sends the uplink data to an application on a computing force over the second bearer. When one first bearer corresponds to a plurality of second bearers, one second bearer may be selected based on an attribute associated with the plurality of second bearers to send the uplink data. For example, QoS corresponding to a quality of service requirement of the uplink data is selected based on QoS associated with the plurality of second bearers, and a second bearer associated with the QoS is further selected. Alternatively, one second bearer is selected from the plurality of second bearers based on a load balancing algorithm, to send the uplink data.

When forwarding downlink data, the network device determines, based on the mapping relationship, a first bearer corresponding to a second bearer, and sends the downlink data to an application on a computing force over the first bearer. When one second bearer corresponds to a plurality of first bearers, one first bearer may be selected based on an attribute associated with the plurality of first bearers to send the downlink data. For example, QoS corresponding to a quality of service requirement of the downlink data is selected based on QoS associated with the plurality of first bearers, and a first bearer associated with the QoS is further selected. Alternatively, one first bearer is selected from the plurality of first bearers based on a load balancing algorithm, to send the downlink data.

For example, it is assumed that the mapping relationship between the first bearer and the second bearer is (1). In an uplink direction, a terminal device generates uplink data of the task 1, and sends the uplink data to the network device over the first bearer 1 corresponding to the task 1, and the network device receives the uplink data from the terminal device over the first bearer 1. The network device may uniquely determine, based on the mapping relationship between the first bearer and the second bearer, the second bearer 1 corresponding to the first bearer 1, and send the uplink data to the application 1 on the computing force over the second bearer 1. For a downlink direction, the application 1 deployed on the computing force, or the specific task 1 in the application 1 sends downlink data to the network device over the second bearer 1, and the network device receives the downlink data from the computing force over the second bearer 1, and may uniquely determine, over the second bearer and the first bearer relationship, the first bearer 1 corresponding to the second bearer 1. The network device sends the downlink data to the terminal device over the first bearer 1.

It is assumed that the mapping relationship between the first bearer and the second bearer is (2). In an uplink direction, a terminal device generates uplink data of the task 1, and sends the uplink data to the network device over the first bearer 1 corresponding to the task 1, and the network device receives the uplink data from the terminal device over the first bearer 1. The network device determines, based on the mapping relationship between the first bearer and the second bearer, that the first bearer 1 has a mapping relationship with both the second bearer 1 and the second bearer 2. The network device may further select one second bearer from the second bearer 1 and the second bearer 2. For example, the network device may select based on attributes of the second bearer 1 and the second bearer 2. For example, the second bearer 1 corresponds to QoS 1, and the second bearer 2 corresponds to QoS 2. The network device may select, based on a quality of service requirement of the uplink data, QoS corresponding to the quality of service requirement, and further select a second bearer corresponding to the QoS. It is assumed that the second bearer 1 corresponding to the QoS 1 is selected, and the network device sends the uplink data to the application 1 on the computing force over the second bearer 1. For a downlink direction, the application 1 deployed on the computing force, or the specific task 1 in the application 1 sends downlink data to the network device over the second bearer 1. If the application 1 corresponds to a plurality of second bearers, a second bearer can be selected based on attributes of the plurality of second bearers corresponding to the application 1, for example, selected based on QoS corresponding to a quality of service requirement. After receiving, over the second bearer 1, the downlink data sent by the application 1 on the computing force, the network device may uniquely determine the first bearer 1 based on the mapping relationship. The network device sends the downlink data to the terminal device over the first bearer 1. If the task 1 generates downlink data, the downlink data may be sent to the network device over the second bearer 1 or the second bearer 2. A specific bearer may be selected based on attributes of the second bearer 1 and the second bearer 2, to send the downlink data. For example, the second bearer is selected based on QoS corresponding to a quality of service requirement. After receiving, over the second bearer 1 or the second bearer 2, the downlink data of the task 1 on the computing force, the network device may uniquely determine the first bearer 1 based on the mapping relationship. The network device sends the downlink data to the terminal device over the first bearer 1.

It is assumed that the mapping relationship between the first bearer and the second bearer is (3). In an uplink direction, a terminal device generates uplink data of the task 1 and the task 2, and sends uplink data 1 to the network device over the first bearer 1 corresponding to the task 1, and the network device receives the uplink data 1 from the terminal device over the first bearer 1. The terminal device sends uplink data 2 to the network device over the first bearer 2 corresponding to the task 2, and the network device receives the uplink data 2 from the terminal device over the first bearer 2. The network device determines, based on the mapping relationship between the first bearer and the second bearer, that the first bearer 1 has a mapping relationship with both the second bearer 1 and the second bearer 2. The network device may further select one second bearer from the second bearer 1 and the second bearer 2. For a method for selecting the second bearer, refer to the description in the previous paragraph. It is assumed that the second bearer 1 is selected, and the network device sends the uplink data 1 to the application 1 on the computing force over the second bearer 1. The network device determines, based on the mapping relationship between the first bearer and the second bearer, the second bearer 1 corresponding to the first bearer 2, and send the uplink data 2 to the application 2 on the computing force over the second bearer 1. For a downlink direction, the application 1 deployed on the computing force generates downlink data, and sends downlink data 1 to the network device over the second bearer 1 corresponding to the application 1. The network device receives the downlink data 1 from the application 1 over the second bearer 1. If the network device determines that the second bearer 1 has a mapping relationship with both the first bearer 1 and the first bearer 2, the network device may select, based on attributes of the first bearer 1 and the first bearer 2, a specific bearer to send the downlink data 1. For example, if the network device determines that a quality of service requirement of the downlink data 1 corresponds to QoS 1, and the first bearer 1 corresponds to the QoS 1, the network device selects to map the second bearer 1 to the first bearer 1, and sends the downlink data 1 over the first bearer 1.

If a specific task 1 generates downlink data, the downlink data may be sent to the network device over the second bearer 1 or the second bearer 2. A specific bearer may be selected based on attributes of the second bearer 1 and the second bearer 2, to send the downlink data. For example, the second bearer is selected based on QoS corresponding to a quality of service requirement. After receiving, over the second bearer 1 or the second bearer 2, the downlink data of the task 1 on the computing force, the network device may determine the first bearer 1 or the first bearer 2 based on the mapping relationship. The network device may further continue to select, based on attributes of the first bearer 1 and the first bearer 2, a bearer to send the downlink data. For example, if the network device determines that a quality of service requirement of the downlink data 1 corresponds to QoS 1, and the first bearer 1 corresponds to the QoS 1, the network device selects to map the second bearer 1 to the first bearer 1, and sends the downlink data 1 over the first bearer 1.

It should be noted that in this embodiment of this disclosure, in addition to the network device, the computing force or the application on the computing force, and the terminal device may record the mapping relationship. When generated data is to be sent, received, or forwarded, the data is sent over a corresponding computing bearer based on the recorded mapping relationship.

The embodiment in FIG. 8 is based on the embodiment in FIG. 3. S301 may be equivalent to S805, S302 may be equivalent to S810 and S812, and S303 may be equivalent to S813 and S815. On this basis, other steps in the embodiment in FIG. 8 are optional, and are an expansion of optional implementations of the embodiment in FIG. 3.

Application Scenario 1: A Computing Force is Deployed Outside a Terminal Device and a Network Device.

Figure 12A:
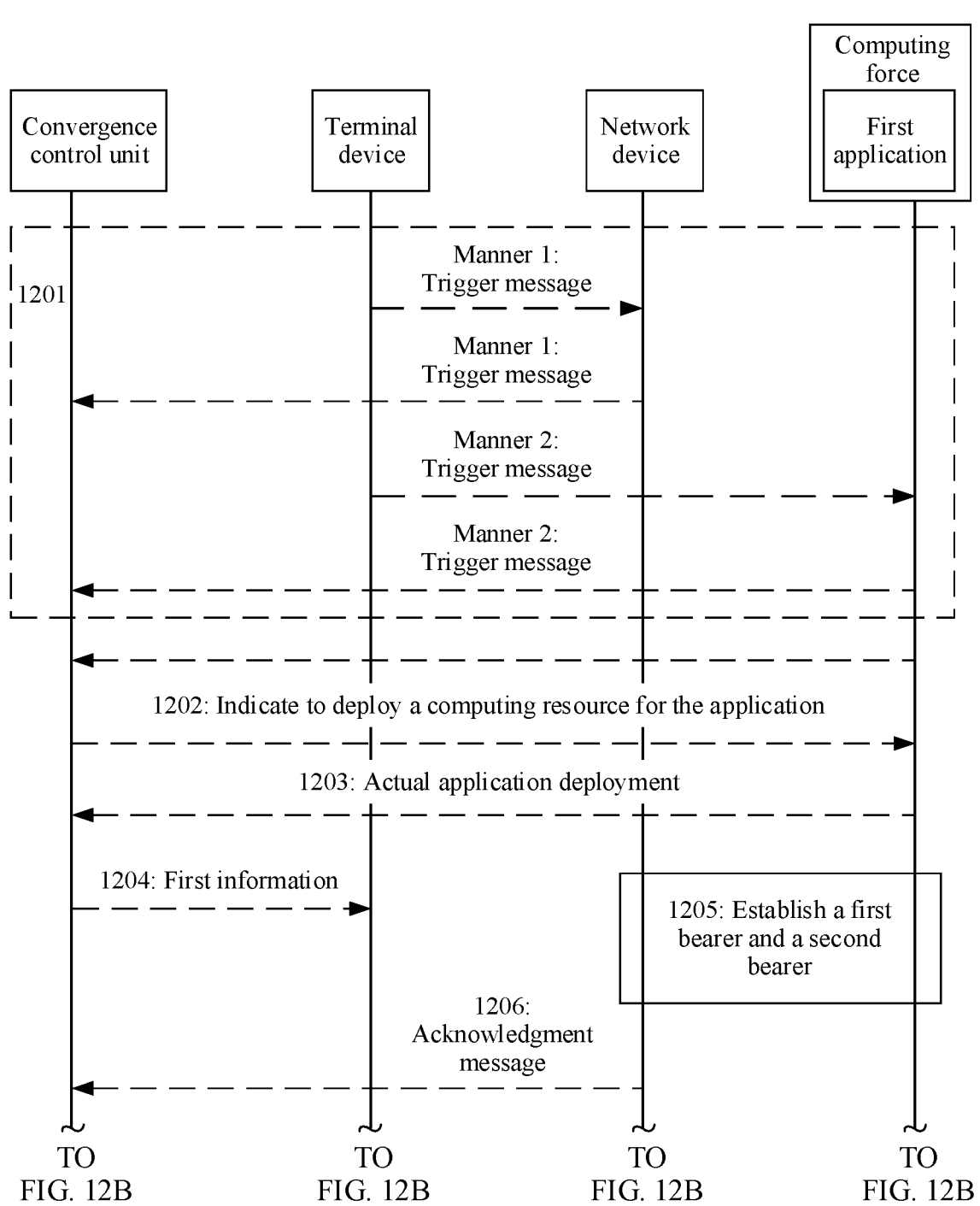
FIG. 12A and FIG. 12B are a schematic flowchart 2 of establishment and application processes of a computing bearer in an application scenario 1 according to an embodiment of this disclosure.
Figures 12A, 12B:
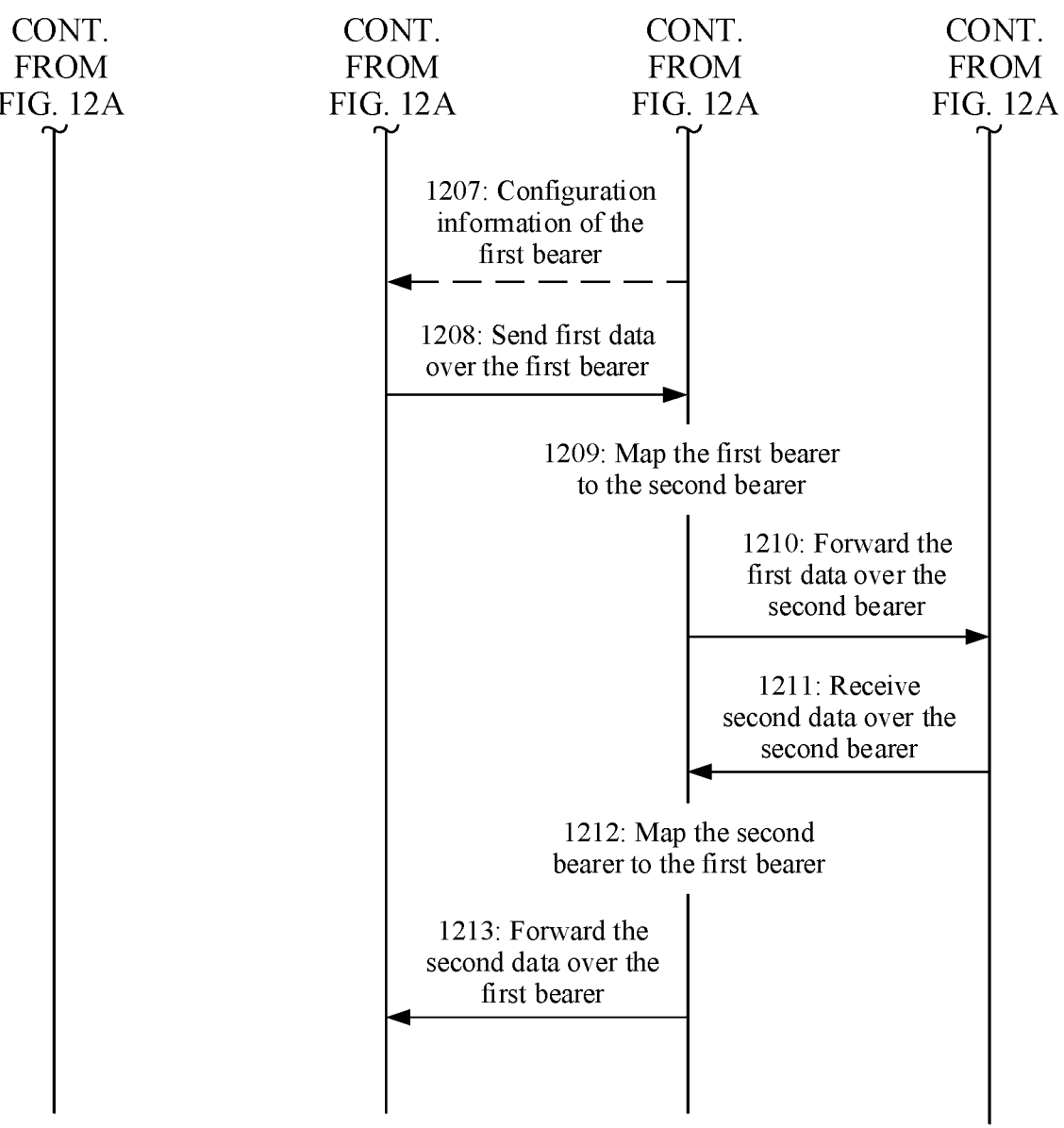

A flowchart of establishment and application processes of a computing bearer in the application scenario 1 is provided. FIG. 12A and FIG. 12B show a second flowchart of establishment and application processes of the computing bearer.

S1201: The terminal device sends a trigger message to a convergence control unit, and the convergence control unit receives the trigger message from the terminal device.

Optionally, the terminal device may send the trigger message via the network device. To be specific, the terminal device sends the trigger message to the network device. After receiving the trigger message from the terminal device, the network device sends the trigger message to the convergence control unit.

Alternatively, the terminal device may send the trigger message by using an application. To be specific, the terminal device sends the trigger message to the application on the computing force. After receiving the trigger message from the terminal device, the application on the computing force sends the trigger message to the convergence control unit.

The trigger message may carry an application deployment requirement.

Optionally, the trigger message may further carry one field. The field may be used to identify a request of establishing a first bearer as a computing bearer, and may be used to distinguish between the first bearer and a data radio bearer DRB. It indicates that a radio bearer requested to be triggered by a current trigger message is not the DRB but the first bearer. S1202: The convergence control unit indicates the computing force to deploy a computing resource for the application, and deploys the application on the computing force.

For detailed descriptions of this step, refer to S802. Details are not described herein again.

S1203: The computing force feeds back actual application deployment information to a convergence control unit.

This step is the same as S803.

S1201 to S1203 are a process of deploying the application on the computing force. They are optional steps, and preparation steps prior to establishment and application of the computing bearer, and may be implemented in another manner. This is not limited in this embodiment of this disclosure.

It may be understood that there may be one or more computing forces. For an operation performed by any computing force or an operation performed by another device for any computing force, refer to descriptions in this embodiment of this disclosure.

S1204: The convergence control unit sends first information to the network device, and the network device receives the first information from the convergence control unit.

For detailed descriptions of this step, refer to S1204. Details are not described herein again.

The first information may carry an identifier of the terminal device, and indicates the network device to establish the first bearer for the terminal device.

S1205: The network device establishes the first bearer and a second bearer.

For establishing the second bearer in this step, refer to S805. Details are not described herein again.

Different from S805, in this step, the network device establishes the first bearer for the terminal device or a session. In S805, the network device establishes the first bearer for a task level.

After establishing the first bearer and the second bearer, the network device establishes a mapping relationship between the first bearer and the second bearer. The mapping relationship may be represented in a table, a graph, a function, or any form.

It may be understood that when there are a plurality of second bearers, the plurality of second bearers may be second bearers between the network device and a plurality of computing forces.

S1206: The network device sends an acknowledgment message to the convergence control unit.

The acknowledgment message is used to respond to the first information, and indicates that the computing bearer is established. This step is optional.

S1207: The network device sends configuration information of the first bearer to the terminal device. The terminal device receives the configuration information of the first bearer from the network device.

Optionally, the network device may send the configuration information of the first bearer to the terminal device based on information about the terminal device that is carried in the first information.

In this embodiment of this disclosure, for a process in which the network device configures the first bearer for the terminal device, refer to a process in which a network device configures a DRB for a terminal device in an existing standard technology. Optionally, the configuration information of the first bearer may include a field used to distinguish whether the configuration is the first bearer or the DRB.

After that, S1208 to S1213 may be further included.

For S1208 to S1210, refer to descriptions of S810 to S812. For S1211 to S1213, refer to descriptions of S813 to S815. Details are not described herein.

In S1210, when there are a plurality of second bearers, the network device may need to send the first data to applications on a plurality of computing forces, or select some computing forces from the plurality of computing forces to send the first data.

In this embodiment, there may be a plurality of computing forces, and there may be a plurality of second bearers. For an operation performed by any computing force, refer to the description in this embodiment of this disclosure. When mapping or forwarding data, the network device needs to determine a specific computing force on which mapping is performed, or separately map the data from the computing force.

The following describes in detail a possible implementation in which the network device establishes the computing bearer.

In S1205, the network device may establish the first bearer based on a terminal device that triggers a task. For example, the first information may include an identifier of a terminal device, and indicates the network device to establish the first bearer for the terminal device.

The network device may establish one or more first bearers for the terminal device. The one or more first bearers may be exclusively used by the terminal device. Certainly, the first bearer established for the terminal device may be shared by another terminal device, but the network device establishes the first bearer for the terminal device.

When the network device establishes the plurality of first bearers for the terminal device, the first bearer may be associated with a specified attribute. For example, the first bearer may be associated with QoS. Assuming that the terminal device has three computing data communication requirements with different QoS requirements, the network device may establish three first bearers for the terminal device. A first bearer 1 is associated with QoS 1, a first bearer 2 is associated with QoS 2, and a first bearer 3 is associated with QoS 3.

For example, the terminal device triggers V2X communication. There are different types of communication services in V2X communication, and correspondingly, there are different quality of service requirements. For example, a quality of service requirement of a V2X communication service used for autonomous driving is very high, and corresponds to the QoS 1. A quality of service requirement of the V2X communication service used for vehicle information collection is lower, and corresponds to the QoS 2. In this case, for the V2X communication service for the terminal device, the network device establishes the first bearer 1 for the V2X communication service used for autonomous driving, and the first bearer 1 is associated with the QoS 1, and establishes the first bearer 2 for the V2X communication service used for vehicle information collection, and the first bearer 2 is associated with the QoS 2. It may be understood that the first bearer may be further associated with another attribute in a manner similar to that of the QoS.

For a method for establishing the second bearer between the network device and the computing force, refer to the foregoing description of the method for establishing the second bearer between the network device and the computing force in S805. Details are not described herein again.

The following describes how the network device establishes a mapping relationship between the first bearer and the second bearer in the embodiment in FIG. 12A and FIG. 12B.

For example, the mapping relationship between the first bearer and the second bearer may have the following types.

(1) A First Bearer and a Second Bearer are in a One-to-One Mapping Relationship.

For example, a network device establishes a first bearer 1 for a first terminal device, and a second bearer 1 for an application 1. The first terminal device triggers a computing task for the application 1. There is a correspondence between the first bearer 1 and the second bearer 1.

In an uplink direction, a terminal device generates uplink data, and sends the uplink data to the network device over the unique first bearer 1, and the network device receives the uplink data from the terminal device over the first bearer 1. The network device may uniquely determine, based on the mapping relationship between the first bearer and the second bearer, the second bearer 1 corresponding to the first bearer 1, and send the uplink data to the application 1 on the computing force over the second bearer 1. For a downlink direction, the application 1 deployed on the computing force, or the specific task 1 in the application 1 sends downlink data to the network device over the second bearer 1, and the network device receives the downlink data from the computing force over the second bearer 1, and may uniquely determine, over the second bearer and the first bearer relationship, the first bearer 1 corresponding to the second bearer 1. The network device sends the downlink data to the terminal device over the first bearer 1.

(2) A First Bearer and a Second Bearer are in a Many-to-One Mapping Relationship.

Figures 13A, 13B:
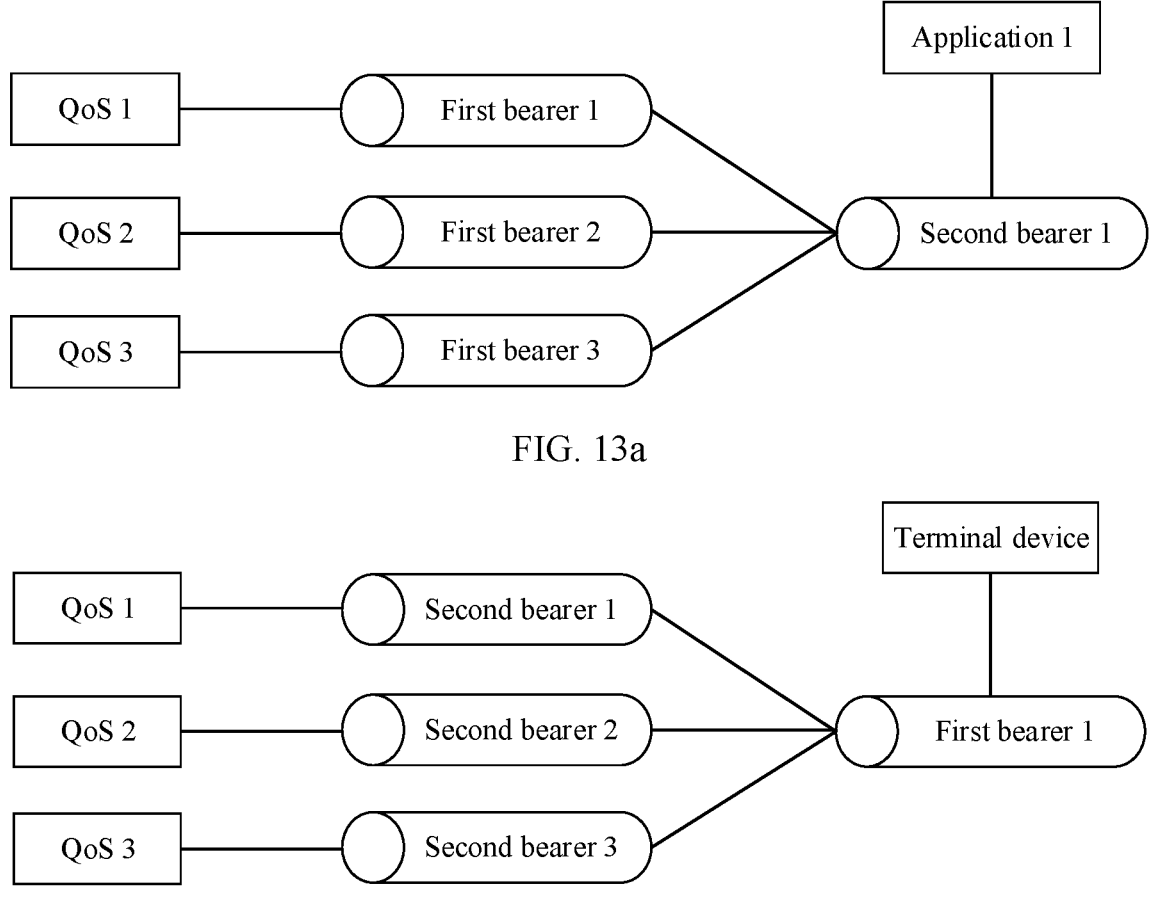
FIG. 13*a* is a schematic diagram 4 of a mapping relationship between a first bearer and a second bearer according to an embodiment of this disclosure.
FIG. 13*b* is a schematic diagram 5 of a mapping relationship between a first bearer and a second bearer according to an embodiment of this disclosure.

For example, as shown in FIG. 13a, a network device establishes a first bearer 1, a first bearer 2, and a second bearer 3 for a terminal device. The first bearer 1, the first bearer 2, and the first bearer 3 respectively correspond to QoS 1, QoS 2, and QoS 3. A second bearer 1 is established for an application 1. The terminal device triggers three computing tasks for the application 1. The three computing tasks have different attributes. For example, the three computing tasks have different QoS requirements: the QoS 1, the QoS 2, and the QoS 3. The three computing tasks of the application 1 may be mapped to a single first bearer, to be specific, the second bearer 1 may have a mapping relationship with the first bearer 1, the first bearer 2, and the first bearer 3.

In an uplink direction: The terminal device generates uplink data 1, uplink data 2, and uplink data 3. Assuming that QoS requirements of uplink data 1 to 3 are the QoS 1 to the QoS 3, the terminal device separately sends the uplink data 1, the uplink data 2, and the uplink data 3 over the first bearer 1, the first bearer 2, and the first bearer 3. The network device receives the uplink data 1 over the first bearer 1, receives the uplink data 2 over the first bearer 2, and receives the uplink data 3 over the first bearer 3. If the first bearer 1, the first bearer 2, and the first bearer 3 all have a mapping relationship with the second bearer 1, the network device sends the uplink data 1, the uplink data 2, and the uplink data 3 to the application 1 on a computing force over the second bearer 1.

For a downlink direction, the application 1 deployed on the computing force generates downlink data, and sends downlink data 1 to the network device over the second bearer 1 corresponding to the application 1. The network device receives the downlink data 1 from the application 1 over the second bearer 1. If the network device determines that the first bearer 1, the first bearer 2, and the first bearer 3 all have a mapping relationship with the second bearer 1, the network device may select, based on a QoS requirement of the downlink data 1, a first bearer 1 that meets the QoS requirement to send the downlink data 1.

(3) A First Bearer and a Second Bearer are in a One-to-Many Mapping Relationship.

For example, as shown in FIG. 13b, a network device establishes a second bearer 1 for an application 1, a second bearer 2 for an application 2, and a second bearer 3 for the application 3. The network device establishes a first bearer 1 for a terminal device. The terminal device triggers tasks for the application 1, the application 2, and the application 3. The first bearer 1 has a mapping relationship with the second bearer 1, the second bearer 2, and the second bearer 3. The second bearer 1, the second bearer 2, and the second bearer 3 respectively correspond to QoS 1, QoS 2, and QoS 3.

A plurality of second bearers may be distinguished by using different configurations. For example, different QoS configurations enable different second bearers to present different capabilities. Alternatively, when receiving tasks with different QoS data transmission requirements, data packets with different QoS requirements in a computing bearer need to select computing application bearers with different characteristics based on a specific status.

In an uplink direction, the terminal device sends the uplink data to the network device over the first bearer 1, and the network device receives the uplink data from the terminal device over the first bearer 1. The network device determines, based on a mapping relationship, that the first bearer 1 has the mapping relationship with the second bearer 1, the second bearer 2, and the second bearer 3. The network device may select, based on a QoS requirement of the uplink data, a second bearer that meets the QoS requirement to send the uplink data.

For a downlink direction, the application 1 deployed on the computing force generates downlink data, and sends downlink data 1 to the network device over the second bearer 1 corresponding to the application 1. The network device receives the downlink data 1 from the application 1 over the second bearer 1. The network device determines that the second bearer 1 has a mapping relationship with the first bearer 1, selects to map the second bearer 1 to the first bearer 1, and sends the downlink data over the first bearer 1.

If a specific task 1 generates downlink data, the downlink data may be sent to the network device over the second bearer 1 or the second bearer 2. A specific bearer may be selected based on attributes of the second bearer 1 and the second bearer 2, to send the downlink data. For example, the second bearer is selected based on QoS corresponding to a quality of service requirement. After receiving, over the second bearer 1 or the second bearer 2, the downlink data of the task 1 on the computing force, the network device may determine the first bearer 1, and send the downlink data over the first bearer 1.

It should be additionally noted that, when the mapping relationship between the first bearer and the second bearer is one-to-many or many-to-one, the first bearer for data transmission is selected from a plurality of first bearers based on an attribute associated with the first bearer. Similarly, the second bearer for data transmission is selected from a plurality of second bearers based on an attribute associated with the second bearer. In another possible implementation, the network device, the terminal device, or the computing force may allocate the data to the first bearer or the second bearer based on a load balancing algorithm.

It should be noted that in this embodiment of this disclosure, in addition to the network device, the computing force or the application on the computing force, and the terminal device may record the mapping relationship. When generated data is to be sent, received, or forwarded, the data is sent over a corresponding computing bearer based on the recorded mapping relationship.

The embodiment in FIG. 12A and FIG. 12B is based on the embodiment in FIG. 3. S301 may be equivalent to S1205, S302 may be equivalent to S1208 and S1210, and S303 may be equivalent to S1211 and S1213. On this basis, other steps in the embodiment in FIG. 12A and FIG. 12B are optional, and are an expansion of optional implementations of the embodiment in FIG. 3.

Application Scenario 2: A Computing Force is Deployed on a Network Device.

In this scenario, the computing force, as a logical function, can function as a part of the network device during system deployment. The computing force may be physically integrated or added to the network device as an accessory device (add-on). The network device becomes a new network device with a computing force capability. The network device may include the computing force. Alternatively, the computing force may be connected to the network device. For example, the computing force is connected to the network device through a bus or an interface. When the network device includes the computing force, the computing force may execute a computing task by using a processor in the network device. When the computing force is connected to the network device, the computing force may execute a computing task by using an additional processor.

A converged control unit becomes an intelligent radio controller for managing and controlling the network devices. Application deployment, computing force resource allocation, or computing bearer establishment can be integrated for processing. This can further optimize a signaling interaction process and accelerate application deployment in the computing force.

Figure 14:
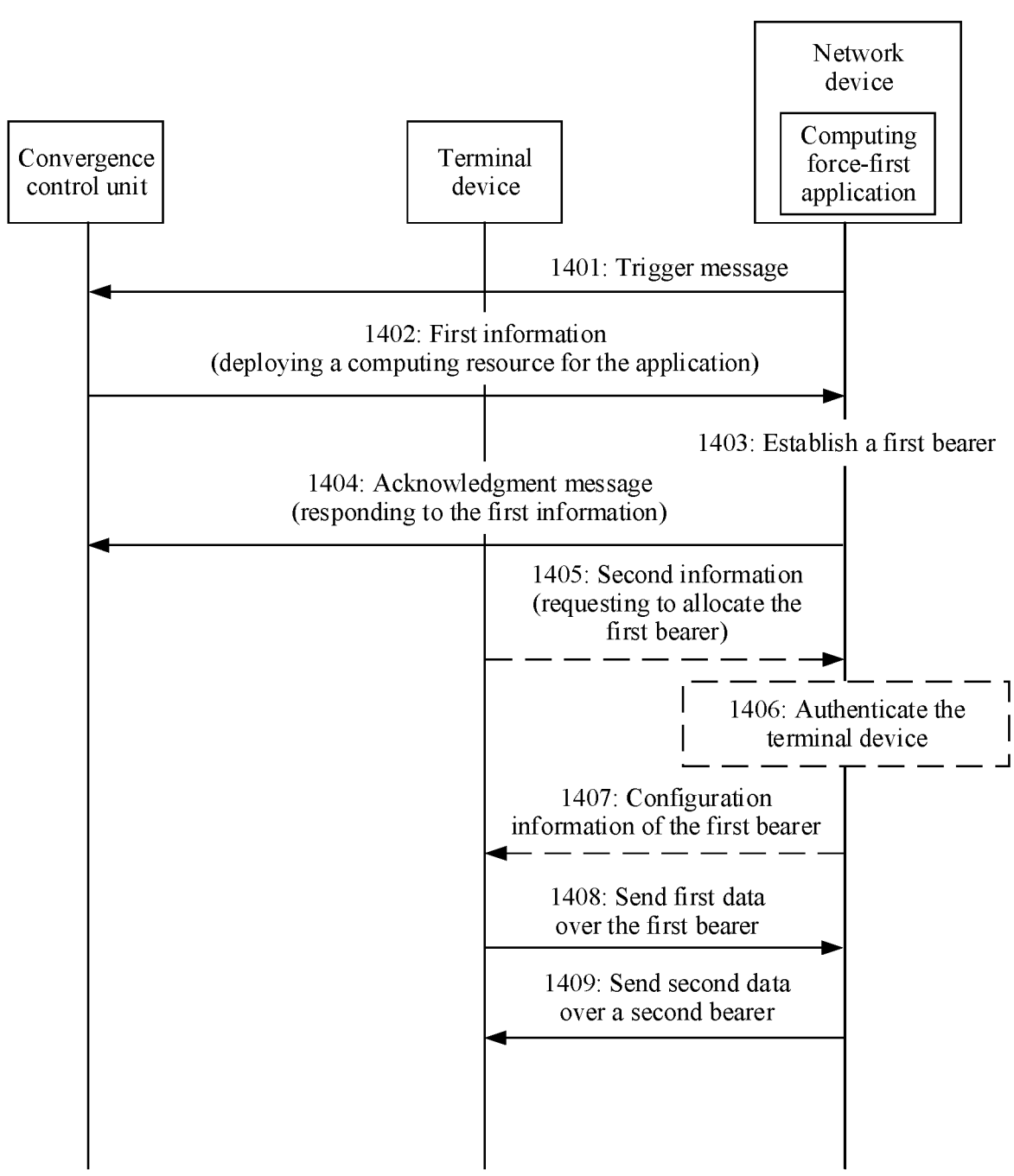
FIG. 14 is a schematic flowchart of establishment and application processes of a computing bearer in an application scenario 2 according to an embodiment of this disclosure.

FIG. 14 shows a flowchart of establishment and application processes of the computing bearer in the application scenario 2.

S1401: A convergence control unit receives a trigger message from an application.

This step may be the same as S801 or S1201.

The convergence control unit receives the trigger message from the application or a terminal. The trigger message carries an application deployment requirement, and may include information such as a computing resource requirement, a to-be-deployed application, a QoS requirement, or terminal authentication.

S1402: The convergence control unit sends first information to a network device, and the network device receives the first information from the convergence control unit.

The first information may indicate the network device to deploy a computing resource for the application, and deploy the application on a computing force of the network device.

The first information further indicates the network device to establish a first bearer and a second bearer. Optionally, the first information may include one or more of the following computing force information: computing force address information, QoS configuration information, or terminal authentication information. The computing force address information may be an IP address, a MAC address, a VLAN ID, or any other identifier address that can be used to establish the second bearer.

Optionally, the convergence control unit may determine, based on the trigger message, computing force information included in the first information.

S1403: The network device establishes the first bearer.

S1404: The network device sends an acknowledgment message to the convergence control unit.

The acknowledgment message is used to respond to the first information, and indicates that the first bearer is established. This step is optional.

S1405: A terminal device sends second information to the network device, and the network device receives the second information from the terminal device.

For this step, refer to S807.

S1406: The network device authenticates the terminal device.

For this step, refer to S808.

may be concurrently performed. Alternatively, only uplink data transmission may occur, or only downlink data transmission may occur.

In this embodiment of this disclosure, the first bearer is a computing bearer between the terminal device and the network device, and may also be referred to as a computing radio bearer (CRB). A DRB may be further established between the terminal device and the network device. Both the CRB and the DRB are radio bearers. The following describes a difference between the CRB and the DRB by using Table 1.

TABLE 1

|  | DRB | CRB |
| --- | --- | --- |
| Establishment manner | Triggered by an internet application or a terminal device by using a core network | Triggered by a computing task (such as AI or a sensing application) of a network device or a terminal device |
| Objective | To support a mobile internet service of the terminal device | To support an application deployed on a computing force inside or outside a radio network, such as an AI application, a sensing application, or an industry application |
| Signaling | A DRB signaling process involves a core network | A CRB signaling process does not involve a core network control plane |
| Data | A core network needs to be used for DRB data transmission | A core network gateway does not need to be used for CRB data transmission |
| Termination point | Uplink data is terminated outside a radio network (behind a UPF on a core network or another GW gateway) | Uplink data is terminated inside a radio network |
| Session mapping | A network device implements a mapping between a DRB and a core network PDU session | A network device implements a mapping between a CRB and a computing application bearer that is between the network device and a computing force |

S1407: The network device sends configuration information of the first bearer to the terminal device, and the terminal device receives the configuration information of the first bearer from the network device.

For this step, refer to S809.

S1408: The terminal device sends first data to the network device over the first bearer. The network device receives the first data from the terminal device over the first bearer.

The first data herein may also be referred to as uplink data. The terminal device may send the first data based on the received configuration information of the first bearer. Optionally, the first data carries an identifier of the application on the computing force.

After receiving the first data reported by the terminal over the first bearer, the network device sends the first data to the application deployed on the computing force of the network device.

S1409: The network device sends second data to the terminal device over the first bearer. The terminal device receives the second data from the network device over the first bearer.

The second data herein may also be referred to as downlink data. Optionally, the second data carries an identifier of the application on the computing force.

S1408 is an uplink data transmission process from the terminal device to the application on the computing force. S1409 is a downlink data transmission process from the application on the computing force to the terminal device. It may be understood that the uplink data transmission process and the downlink data transmission process are not performed in a strict sequence, and may exchange sequences, or In the foregoing embodiments provided in this disclosure, the method provided in embodiments of this disclosure is separately described from perspectives of the network device, the terminal device, and interaction between the network device, the terminal device, and the computing force.

To implement functions in the method provided in the foregoing embodiments of this disclosure, the network device and the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 15:
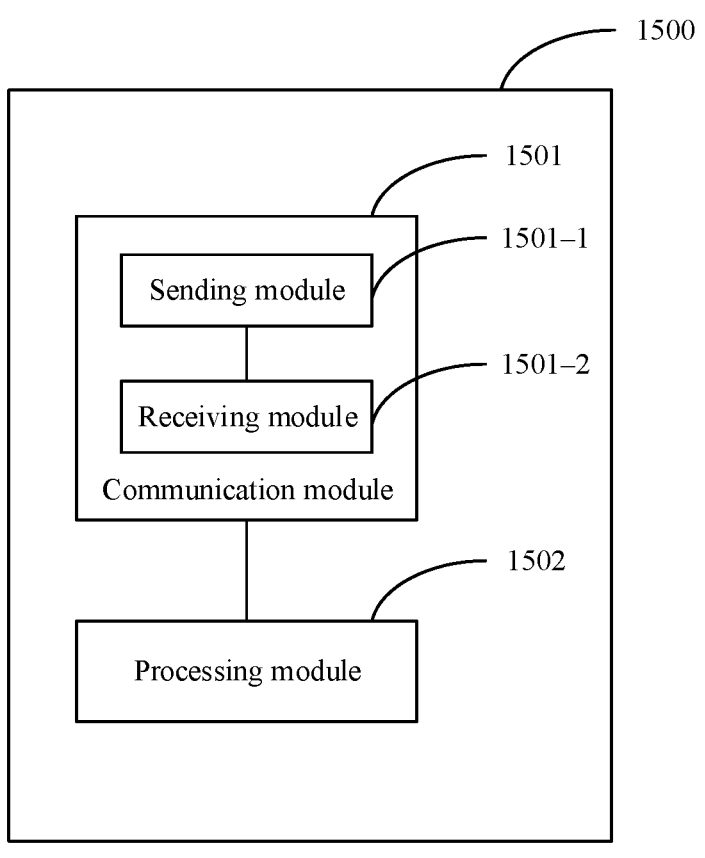
FIG. 15 is a schematic diagram 1 of a structure of a communication apparatus according to an embodiment of this disclosure.

As shown in FIG. 15, based on a same technical concept, an embodiment of this disclosure further provides a communication apparatus 1500. The communication apparatus 1500 may be a terminal device or a network device, an apparatus in a terminal device or a network device, or an apparatus that can be used together with a terminal device or a network device. In a design, the communication apparatus 1500 may include modules for performing the methods/operations/steps/actions performed by the terminal device or the network device in the foregoing method embodiments. The modules may be hardware circuits, may be software, or may be implemented by using the hardware circuits in combination with the software. In a design, the communication apparatus 1500 may include a communication module 1501 and a processing module 1502. The processing module 1502 is configured to invoke the communication module 1501 to perform a receiving and/or sending function. The communication module 1501 may be further divided into a sending module 1501-1 and a receiving module 1501-2.

When the communication apparatus 1500 is configured to perform an operation performed by the terminal device, the sending module 1501-1 is configured to send a trigger message to the network device. The trigger message is used to request to establish a first bearer. The first bearer is a computing bearer between the terminal device and the network device. The trigger message includes a first field. The first field is used to distinguish between the first bearer and a data radio bearer DRB.

The receiving module 1501-2 is configured to receive configuration information from the network device. The configuration information is used to configure the first bearer.

Optionally, the sending module 1501-1 is further configured to send first data to the network device over the first bearer. The first data is generated when a computing task of a first application is executed.

Optionally, the receiving module 1501-2 is further configured to receive second data from the network device over the first bearer. The second data is generated when a computing task of a first application is executed.

The first application is deployed on a computing force. The computing force is located inside a radio network, or the computing force is deployed outside the radio network. The computing force is directly connected to the network device.

The sending module 1501-1 and the receiving module 1501-2 are further configured to perform another operation performed by the terminal device in the foregoing method embodiments. Details are not described herein again.

When the communication apparatus 1500 is configured to perform an operation performed by the network device, the processing module 1502 is configured to establish a first bearer and a second bearer. The first bearer is a computing bearer between the network device and the terminal device. The second bearer is a computing bearer between the network device and a first application. The communication module 1501 is configured to receive first data from the terminal device over the first bearer, and forward the first data over the second bearer; and/or the communication module 1501 is configured to: receive second data over the second bearer, and forward the second data to the terminal device over the first bearer.

The first application is deployed on a computing force. The computing force is located inside a radio network, or the computing force is deployed outside the radio network. The computing force is directly connected to the network device.

The computing bearer is used for communication between the terminal device and the first application when a computing task is executed.

Optionally, the second bearer is established based on a wired protocol layer between the network device and the computing force; or the second bearer is established based on a radio access protocol layer between the network device and the computing force.

Optionally, the processing module 1502 is further configured to: establish a mapping relationship between the first bearer and the second bearer, and determine, based on the mapping relationship, the second bearer corresponding to the first bearer. The communication module is configured to forward the first data over the second bearer.

The processing module 1502 is further configured to determine based on the mapping relationship, the first bearer corresponding to the second bearer. The communication module is configured to forward the second data to the terminal device over the first bearer.

The mapping relationship between the first bearer and the second bearer includes that one first bearer corresponds to a plurality of second bearers, or a plurality of first bearers correspond to a plurality of second bearers.

The processing module 1502 is configured to: determine based on the mapping relationship, the plurality of second bearers corresponding to the first bearer; and if the second bearer is associated with quality of service QoS, select based on QoS separately associated with the plurality of second bearers, a second bearer associated with QoS that meets a quality of service requirement of the first data, and forward the first data by using the communication module. Alternatively, the processing module is configured to forward the first data over one of the plurality of second bearers and the communication module based on a load balancing algorithm.

The mapping relationship between the first bearer and the second bearer includes that a plurality of first bearers correspond to one second bearer, or a plurality of first bearers correspond to a plurality of second bearers.

The processing module 1502 is configured to: determine based on the mapping relationship, the plurality of first bearers corresponding to the second bearer; and if the first bearer is associated with QoS, select, based on QoS separately associated with the plurality of first bearers, a first bearer associated with QoS that meets a quality of service requirement of the second data, and forward the second data by using the communication module. Alternatively, the processing module is configured to forward the second data over one of the plurality of first bearers and the communication module based on a load balancing algorithm.

Optionally, the communication module 1501 is further configured to receive first information from a convergence control unit. The first information indicates the network device to establish the first bearer and the second bearer.

Optionally, the first information includes one or more of the following information: computing force address information, QoS configuration information, terminal authentication information, an identifier of a first task, or an identifier of the terminal device. The terminal authentication information is used to authenticate whether the terminal device is qualified to use the first bearer. The computing force address information is used by the network device to establish the second bearer.

Optionally, the communication module is further configured to receive a trigger message from the terminal device. The trigger message is used to request to establish the first bearer.

The communication module 1501 and the processing module 1502 are further configured to perform another operation performed by the network device in the foregoing method embodiments. Details are not described herein again.

Division into the modules in embodiments of this disclosure is an example, is merely division into logical functions, and may be other division during actual implementation. In addition, function modules in embodiments of this disclosure may be integrated into one processor, or each of the modules may exist alone physically, or two or more modules may be integrated into one module. The integrated module may be implemented in a form of hardware, or may be implemented in a form of a software function module.

Figure 16:
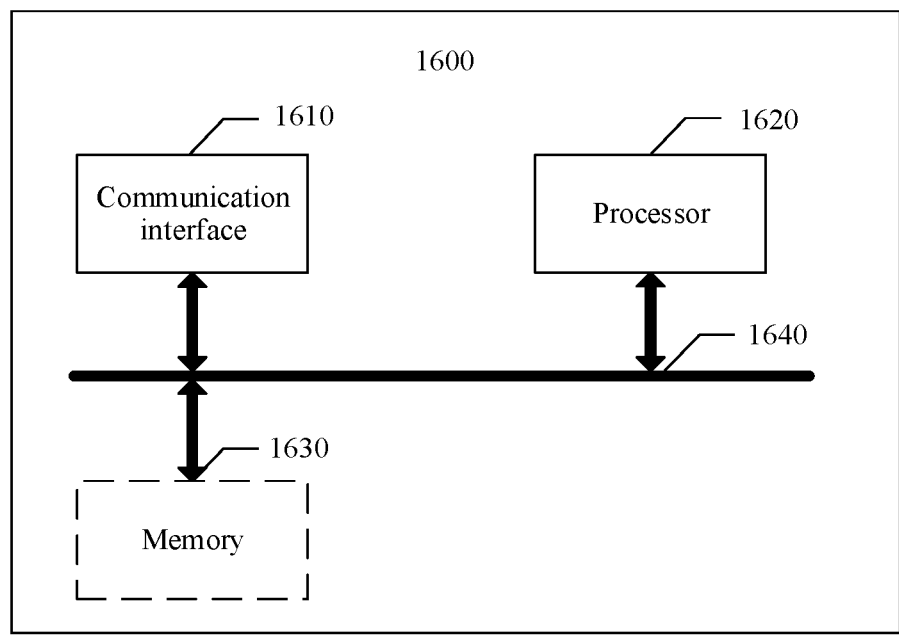
FIG. 16 is a schematic diagram 2 of a structure of a communication apparatus according to an embodiment of this disclosure.

FIG. 16 shows a communication apparatus 1600 according to an embodiment of this disclosure. The communication apparatus 1600 is configured to implement functions of the terminal device or the network device in the foregoing method. When implementing functions of the network device, the apparatus may be a network device, an apparatus in a network device, or an apparatus that can be used together with a network device. When implementing functions of the terminal device, the apparatus may be a terminal device, an apparatus in a terminal device, or an apparatus that can be used together with a terminal device. The apparatus may be a chip system. In this embodiment of this disclosure, the chip system may include a chip, or may include a chip and another discrete component. The communication apparatus 1600 includes at least one processor 1620, configured to implement the functions of the terminal device or the network device in the method provided in embodiments of this disclosure. The apparatus 1600 may further include a communication interface 1610. In this embodiment of this disclosure, the communication interface may be a transceiver, a circuit, a bus, a module, or an interface of another type, and is configured to communicate with another device by using a transmission medium. For example, the communication interface 1610 is used for an apparatus in the communication apparatus 1600 to communicate with another device. For example, when the communication apparatus 1600 is a network device, the another device may be a terminal device. When the communication apparatus 1600 is a terminal device, the another apparatus may be a network device. The processor 1620 receives and sends data through the communication interface 1610, and is configured to implement the methods in the foregoing method embodiments.

For example, when a function of the terminal device is implemented, the communication interface 1610 is configured to send a trigger message to the network device. The trigger message is used to request to establish a first bearer. The first bearer is a computing bearer between the terminal device and the network device. The trigger message includes a first field, and the first field is used to distinguish between the first bearer and a data radio bearer DRB. The communication interface 1610 is further configured to receive configuration information from the network device. The configuration information is used to configure the first bearer.

When a function of the network device is implemented, the processor 1620 is configured to establish a first bearer and a second bearer. The first bearer is the computing bearer between the terminal device and the network device. The second bearer is a computing bearer between the network device and a first application. The communication interface 1610 is configured to receive first data from the terminal device over the first bearer, and forward the first data over the second bearer; and/or the communication interface 1610 is configured to receive second data over the second bearer, and forward the second data to the terminal device over the first bearer.

The processor 1620 and the communication interface 1610 may further be configured to perform another corresponding step or operation performed by the terminal device or the network device in the foregoing method embodiments. Details are not described herein again.

The communication apparatus 1600 may further include at least one memory 1630, configured to store program instructions and/or data. The memory 1630 is coupled to the processor 1620. The coupling in this embodiment of this disclosure may be an indirect coupling or a communication connection between apparatuses, units, or modules in an electrical form, a mechanical form, or another form, and is used for information interaction between the apparatuses, the units, or the modules. The processor 1620 may cooperate with the memory 1630. The processor 1620 may execute the program instructions stored in the memory 1630. At least one of the at least one memory may be integrated with the processor.

A specific connection medium between the communication interface 1610, the processor 1620, and the memory 1630 is not limited in this embodiment of this disclosure. In this embodiment of this disclosure, the memory 1630, the processor 1620, and the communication interface 1610 are connected to each other through a bus 1640 in FIG. 16. The bus is represented by using a thick line in FIG. 16. A connection manner between other components is only an example for descriptions, and is not limited thereto. The bus may be classified into an address bus, a data bus, a control bus, and the like. For ease of representation, only one thick line is for representing the bus in FIG. 16, but this does not mean that there is only one bus or only one type of bus.

When the communication apparatus 1500 and the communication apparatus 1600 are chips or chip systems, the communication module 1501 and the communication interface 1610 may output or receive baseband signals. For example, the baseband signal may be a signal such as the first data, the second data, or the configuration information of the first bearer in the foregoing method embodiments. When the communication apparatus 1500 and the communication apparatus 1600 are devices, the communication module 1601 and the communication interface 1610 may output or receive radio frequency signals. In this embodiment of this disclosure, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this disclosure. The general purpose processor may be a microprocessor or any conventional processor or the like. The steps of the method disclosed with reference to embodiments of this disclosure may be directly performed by a hardware processor, or may be performed by using a combination of hardware in the processor and a software module.

In this embodiment of this disclosure, the memory 1630 may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in embodiments of this disclosure may alternatively be a circuit or any other apparatus that can implement a storage function, and is configured to store the program instructions and/or the data.

Some or all of the operations and functions that are performed by the terminal and that are described in the foregoing method embodiments of this disclosure, or some or all of the operations and functions that are performed by the network device and that are described in the foregoing method embodiments of this disclosure may be completed by using a chip or an integrated circuit.

To implement the functions of the communication apparatus in FIG. 15 or FIG. 16, an embodiment of this disclosure further provides a chip, including a processor, configured to support the communication apparatus in implementing the functions of the terminal or the network device in the foregoing method embodiments. In a possible design, the chip is connected to a memory or the chip includes the memory, and the memory is configured to store program instructions and data that are necessary for the communication apparatus.

An embodiment of this disclosure provides a computer-readable storage medium storing a computer program. The computer program includes instructions used to perform the foregoing method embodiments.

An embodiment of this disclosure provides a computer program product including instructions. When the computer program product runs on a computer, the foregoing method embodiments are performed.

A person skilled in the art should understand that embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to the embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some embodiments of this disclosure have been described, a person skilled in the art can make changes and modifications to these embodiments once they learn the basic inventive concept. Therefore, the appended claims are intended to be construed as to cover the embodiments and all changes and modifications falling within the scope of this disclosure.

Clearly, a person skilled in the art can make various modifications and variations to embodiments of this disclosure without departing from the scope of embodiments of this disclosure. This disclosure is intended to cover these modifications and variations of embodiments of this disclosure provided that they fall within the scope of protection defined by the following claims of this disclosure and their equivalent technologies.

What is claimed is:

1. An application method, comprising:
establishing, by a first communication apparatus, a first bearer and a second bearer, wherein the first bearer is a computing bearer between the first communication apparatus and a second communication apparatus, the first communication apparatus includes a network device, the second communication apparatus includes a user equipment (UE), and the second bearer is a computing bearer between the first communication apparatus and a first application; and
performing at least one sequence of the following sequential operations:
receiving, by the first communication apparatus, first data from the second communication apparatus over the first bearer, and forwarding the first data over the second bearer; or
receiving, by the first communication apparatus, second data over the second bearer, and forwarding the second data to the second communication apparatus over the first bearer.

2. The application method according to claim 1, wherein:
the first application is deployed on a computing force, the computing force is located inside a radio network, or the computing force is deployed outside the radio network, and the computing force is directly connected to the first communication apparatus; and
the first bearer and the second bearer are used for communication between the second communication apparatus and the first application when a computing task is executed.

3. The application method according to claim 2, wherein:
the second bearer is established based on a wired protocol layer between the first communication apparatus and the computing force; or
the second bearer is established based on a radio access protocol layer between the first communication apparatus and the computing force.

4. The application method according to claim 1, wherein:
the application method comprises:
establishing, by the first communication apparatus, a mapping relationship between the first bearer and the second bearer;
the forwarding the first data over the second bearer comprises:
determining, by the first communication apparatus based on the mapping relationship, the second bearer corresponding to the first bearer; and
forwarding the first data over the second bearer; and
the forwarding the second data to the second communication apparatus over the first bearer comprises:
determining, by the first communication apparatus based on the mapping relationship, the first bearer corresponding to the second bearer; and
forwarding the second data to the second communication apparatus over the first bearer.

5. The application method according to claim 4, wherein:
the mapping relationship between the first bearer and the second bearer comprises that one first bearer corresponds to a plurality of second bearers, or that a plurality of first bearers correspond to a plurality of second bearers; and
the determining, by the first communication apparatus based on the mapping relationship, the second bearer corresponding to the first bearer, and forwarding the first data over the second bearer comprises:
    determining, by the first communication apparatus based on the mapping relationship, the plurality of second bearers corresponding to the first bearer; and
    in response to determining that the second bearer is associated with quality of service (QoS), selecting, by the first communication apparatus based on QoS separately associated with the plurality of second bearers, a second bearer associated with QoS that meets a QoS requirement of the first data, and forwarding the first data; or
    forwarding, by the first communication apparatus, the first data over one of the plurality of second bearers based on a load balancing algorithm.

6. The application method according to claim 4, wherein:
the mapping relationship between the first bearer and the second bearer comprises that a plurality of first bearers correspond to one second bearer, or a plurality of first bearers correspond to a plurality of second bearers; and
the determining, by the first communication apparatus based on the mapping relationship, the first bearer corresponding to the second bearer, and forwarding the second data to the second communication apparatus over the first bearer comprises:
    determining, by the first communication apparatus based on the mapping relationship, the plurality of first bearers corresponding to the second bearer; and
    in response to determining that the first bearer is associated with QoS, selecting, by the first communication apparatus based on QoS separately associated with the plurality of first bearers, a first bearer associated with QoS that meets a QoS requirement of the second data, and forwarding the second data; or
    forwarding, by the first communication apparatus, the second data over one of the plurality of first bearers based on a load balancing algorithm.

7. The application method according to claim 1, wherein the application method further comprises:
receiving, by the first communication apparatus, first information from a convergence control unit, wherein the first information indicates to the first communication apparatus to establish the first bearer and the second bearer.

8. The application method according to claim 7, wherein the first information comprises one or more of the following information: computing force address information, QoS configuration information, terminal authentication information, an identifier of a first task, or an identifier of the second communication apparatus, and wherein the terminal authentication information is used to authenticate whether the second communication apparatus is qualified to use the first bearer, and the computing force address information is used by the first communication apparatus to establish the second bearer.

9. The application method according to claim 1, wherein the application method further comprises:

receiving, by the first communication apparatus from the second communication apparatus, a trigger message requesting to establish the first bearer.

10. A communication apparatus, applied to a first communication apparatus, wherein the communication apparatus comprises:
at least one processor; and
one or more memories coupled to the at least one processor and storing programming instructions for execution by the at least one processor to:
    establish a first bearer and a second bearer, wherein the first bearer is a computing bearer between the first communication apparatus and a second communication apparatus, the first communication apparatus includes a network device, the second communication apparatus includes a user equipment (UE), and the second bearer is a computing bearer between the first communication apparatus and a first application; and
perform at least one sequence of the following sequential operations:
    receive first data from the second communication apparatus over the first bearer, and forward the first data over the second bearer; or
    receive second data over the second bearer, and forward the second data to the second communication apparatus over the first bearer.

11. The communication apparatus according to claim 10, wherein:
the first application is deployed on a computing force, the computing force is located inside a radio network, or the computing force is deployed outside the radio network, and the computing force is directly connected to the first communication apparatus; and
the first bearer and the second bearer are used for communication between the second communication apparatus and the first application when a computing task is executed.

12. The communication apparatus according to claim 11, wherein:
the second bearer is established based on a wired protocol layer between the first communication apparatus and the computing force; or
the second bearer is established based on a radio access protocol layer between the first communication apparatus and the computing force.

13. The communication apparatus according to claim 10, wherein the one or more memories store the programming instructions for execution by the at least one processor to:
establish a mapping relationship between the first bearer and the second bearer, and determine, based on the mapping relationship, the second bearer corresponding to the first bearer; and forward the first data over the second bearer; or
determine based on the mapping relationship, the first bearer corresponding to the second bearer; and forward the second data to the second communication apparatus over the first bearer.

14. The communication apparatus according to claim 13, wherein:
the mapping relationship between the first bearer and the second bearer comprises that one first bearer corresponds to a plurality of second bearers, or a plurality of first bearers correspond to a plurality of second bearers; and
the one or more memories store the programming instructions for execution by the at least one processor to:

determine based on the mapping relationship, the plurality of second bearers corresponding to the first bearer; and in response to determining that the second bearer is associated with quality of service (QoS), select, based on QoS separately associated with the plurality of second bearers, a second bearer associated with QoS that meets a QoS requirement of the first data, and forward the first data; or forward the first data over one of the plurality of second bearers based on a load balancing algorithm.

15. The communication apparatus according to claim 13, wherein:

the mapping relationship between the first bearer and the second bearer comprises that a plurality of first bearers correspond to one second bearer, or a plurality of first bearers correspond to a plurality of second bearers; and the one or more memories store the programming instructions for execution by the at least one processor to:

determine based on the mapping relationship, the plurality of first bearers corresponding to the second bearer; and in response to determining that the first bearer is associated with QoS, select, based on QoS separately associated with the plurality of first bearers, a first bearer associated with QoS that meets a QoS requirement of the second data, and forward the second data; or forward the second data over one of the plurality of first bearers based on a load balancing algorithm.

16. The communication apparatus according to claim 10, wherein the one or more memories store the programming instructions for execution by the at least one processor to:

receive first information from a convergence control unit, wherein the first information indicates to the first communication apparatus to establish the first bearer and the second bearer; or receive, from the second communication apparatus, a trigger message requesting to establish the first bearer.

17. The communication apparatus according to claim 16, wherein the first information comprises one or more of the following information: computing force address information, QoS configuration information, terminal authentication information, an identifier of a first task, or an identifier of the second communication apparatus, and wherein the terminal authentication information is used to authenticate whether the second communication apparatus is qualified to use the first bearer, and the computing force address information is used by the first communication apparatus to establish the second bearer.

* * * * *